United States Patent
Prager et al.

(10) Patent No.: US 11,137,372 B2
(45) Date of Patent: Oct. 5, 2021

(54) EDDY CURRENT NONDESTRUCTIVE EVALUATION DEVICE WITH ROTATING PERMANENT MAGNETS AND PICKUP COILS

(71) Applicant: Eagle Harbor Technologies, Inc., Seattle, WA (US)

(72) Inventors: James R. Prager, Seattle, WA (US); Timothy M. Ziemba, Bainbridge Island, WA (US); Kenneth E. Miller, Seattle, WA (US); Ilia Slobodov, Seattle, WA (US); Paul Melnik, Seattle, WA (US); Connor Liston, Seattle, WA (US); Kevin Muggli, Mountlake Terrace, WA (US); TaiSheng Yeager, Seattle, WA (US); John G. Carscadden, Seattle, WA (US)

(73) Assignee: EAGLE HARBOR TECHNOLOGIES, INC., Seattle, WA (US)

(*) Notice: Subject to any disclaimer, the term of this patent is extended or adjusted under 35 U.S.C. 154(b) by 82 days.

(21) Appl. No.: 16/297,352

(22) Filed: Mar. 8, 2019

(65) Prior Publication Data

US 2019/0277804 A1    Sep. 12, 2019

Related U.S. Application Data

(60) Provisional application No. 62/640,542, filed on Mar. 8, 2018.

(51) Int. Cl.
*G01N 27/90* (2021.01)
*G01N 27/9013* (2021.01)

(52) U.S. Cl.
CPC ....... *G01N 27/9006* (2013.01); *G01N 27/906* (2013.01); *G01N 27/9013* (2013.01)

(58) Field of Classification Search
CPC .......... G01N 27/9013; G01N 27/9033; G01N 27/906; G01N 27/902; G01N 27/908
See application file for complete search history.

(56) References Cited

U.S. PATENT DOCUMENTS

| | | | | |
|---|---|---|---|---|
| 3,268,805 A | * | 8/1966 | Normando | B23Q 35/13 324/240 |
| 4,134,067 A | * | 1/1979 | Woodbury | G01N 27/9046 324/219 |

(Continued)

FOREIGN PATENT DOCUMENTS

WO    WO-2017082770 A1 * 5/2017 ......... G01N 27/9053

OTHER PUBLICATIONS

Eagle Harbor Technologies; User's Manual for Integrator Long Pulse ILP8; Aug. 22, 2016; pp. 1-27.*

*Primary Examiner* — Jay Patidar
(74) *Attorney, Agent, or Firm* — Sanders IP Law

(57) ABSTRACT

Some embodiments of the invention may include an eddy current nondestructive evaluation device. The eddy current nondestructive evaluation device may include a rotating body; a motor coupled with the rotating body such that the motor rotates the rotating body; a permanent magnet coupled with the rotating body; a pickup coil coupled with the rotating body; and an integrator circuit electrically coupled with the pickup coil that integrates a voltage from the pickup coil to produce integrated voltage data.

24 Claims, 31 Drawing Sheets

(56) References Cited

U.S. PATENT DOCUMENTS

| | | | | |
|---|---|---|---|---|
| 5,414,353 A | * | 5/1995 | Weischedel | G01N 27/82 |
| | | | | 324/232 |
| 2006/0145703 A1 | * | 7/2006 | Steinbichler | G01S 5/163 |
| | | | | 324/512 |
| 2011/0125462 A1 | * | 5/2011 | Petrosky | G21D 1/006 |
| | | | | 702/188 |
| 2012/0123699 A1 | * | 5/2012 | Kawata | G01N 27/9006 |
| | | | | 702/35 |
| 2015/0160042 A1 | * | 6/2015 | Bogos | G01D 5/20 |
| | | | | 324/207.15 |

* cited by examiner

EDDY CURRENT NONDESTRUCTIVE EVALUATION DEVICE WITH ROTATING PERMANENT MAGNETS AND PICKUP COILS

BACKGROUND

Nondestructive evaluation (NDE) and testing techniques are widely used within the aerospace, metal forming, nuclear power, and construction industries to test materials for proper manufacturing, wear, aging, and failure.

Complex high-performance structures, for example, typically must meet strict damage tolerance requirements. To ensure the quality of the structures, an accurate assessment of the as-built state is necessary. While tremendous improvements in manufacturing methods have resulted in the fabrication of more reliable components, manufacturing flaws do exist that can affect the performance of these materials. Furthermore, there is a variety of damage that can occur to structures and materials throughout their service life.

SUMMARY

Some embodiments of the invention may include an eddy current nondestructive evaluation device. The eddy current nondestructive evaluation device may include a rotating body; a motor coupled with the rotating body such that the motor rotates the rotating body; a permanent magnet coupled with the rotating body; a pickup coil coupled with the rotating body; and an integrator circuit electrically coupled with the pickup coil that integrates a voltage from the pickup coil to produce integrated voltage data.

Some embodiments of the invention may include an eddy current nondestructive evaluation device comprising: a rotating body; a motor coupled with the rotating body such that the motor rotates the rotating body; a permanent magnet coupled with the rotating body; a pickup coil coupled with the rotating body; and an integrator circuit electrically coupled with the pickup coil that integrates a voltage from the pickup coil to produce integrated voltage data.

In some embodiments, the pickup coil includes a plurality of loops wrapped around a bobbin coupled with the rotating body so that the permanent magnet and the pickup coil stationary relative to one another while the rotating body is rotated.

In some embodiments, the integrator circuit has an RC timescale less than about 1 ms. In some embodiments, the integrator circuit has an RC timescale of about 1 µs and 100 ms In some embodiments, the integrator circuit is stable for more than about 1 second. In some embodiments, the motor is configured to vary the angular velocity of the rotating body between 1 Hz and 200 Hz. In some embodiments, the integrator circuit comprises one or more droop resistors placed across the integration capacitors to achieve a droop RC timescale between 10 µs and 100 ms.

In some embodiments, the integrator circuit is coupled within the rotating body. In some embodiments, the eddy current nondestructive evaluation device may also include a data acquisition unit electrically coupled with the integrator circuit. In some embodiments, the pickup coil comprises between 20 and 3000 loops of wire.

In some embodiments, the eddy current nondestructive evaluation device may include a wireless transmitter coupled with the rotating body and electrically coupled with the integrator circuit, the wireless transmitter configured to wirelessly transmit the integrated voltage data.

In some embodiments, the eddy current nondestructive evaluation device may include a rotational sensor coupled with the rotating body. In some embodiments, the eddy current nondestructive evaluation device may include a position tracking system coupled with the rotating body.

In some embodiments, the eddy current nondestructive evaluation device may include a second permanent magnet coupled with the rotating body; a second pickup coil coupled with the rotating body; and a second integrator circuit electrically coupled with the second pickup coil that integrates a voltage from the second pickup coil to produce integrated voltage data.

In some embodiments, the eddy current nondestructive evaluation device may include a rotating contactor providing electrical signals and power from within the rotating body to be coupled to an external non-rotating wiring harness.

In some embodiments, the eddy current nondestructive evaluation device may include a data storage and retrieval system coupled with the rotating body and electrically coupled with the integrator circuit.

Some embodiments may include an eddy current nondestructive evaluation device that includes a translating body; a permanent magnet coupled with the translating body; a pickup coil coupled with the translating body; and an integrator circuit electrically coupled with the pickup coil that integrates a voltage from the pickup coil to produce integrated voltage data.

In some embodiments, the eddy current nondestructive evaluation device may include the translating body may be coupled with a fixed apparatus and the sample is translated or rotated relative to the translating body.

In some embodiments, the eddy current nondestructive evaluation device may include the translation rate of the translating body relative to a sample surface can be about 0.05 m/s to about 10 m/s.

In some embodiments, the eddy current nondestructive evaluation device may include the permanent magnet comprises a plurality of permanent magnets, wherein the pickup coil comprises a plurality of pickup coils, and wherein the integrator circuit comprises a plurality of integrator circuits.

In some embodiments, the eddy current nondestructive evaluation device may include the pickup coil may be either stationary or moving relative to the permanent magnet.

Some embodiments include a method including moving one or more permanent magnets and one or more pickup coils at a rate of movement near a surface of a sample; integrating one or more voltage signals from the one or more pickup coils to produce integrated voltage data; and determining at least one of a depth, a size, and a shape of a defect in the sample based at least on the integrated voltage data and the rate of movement. The method may also include varying the rate of movement in response to integrated voltage data to increase the sensitivity at the estimated depth of the defect. The method may also include reconstructing the size and shape of a defect in the sample based on the integrated voltage data and the rate of movement. The method may also include identifying defects in the surface of the sample by comparing the integrated voltage data with a reference database of known samples and defects.

BRIEF DESCRIPTION OF THE DRAWINGS

These and other features, aspects, and advantages of the present disclosure are better understood when the following Detailed Description is read with reference to the accompanying drawings.

DETAILED DESCRIPTION

Figure 1:
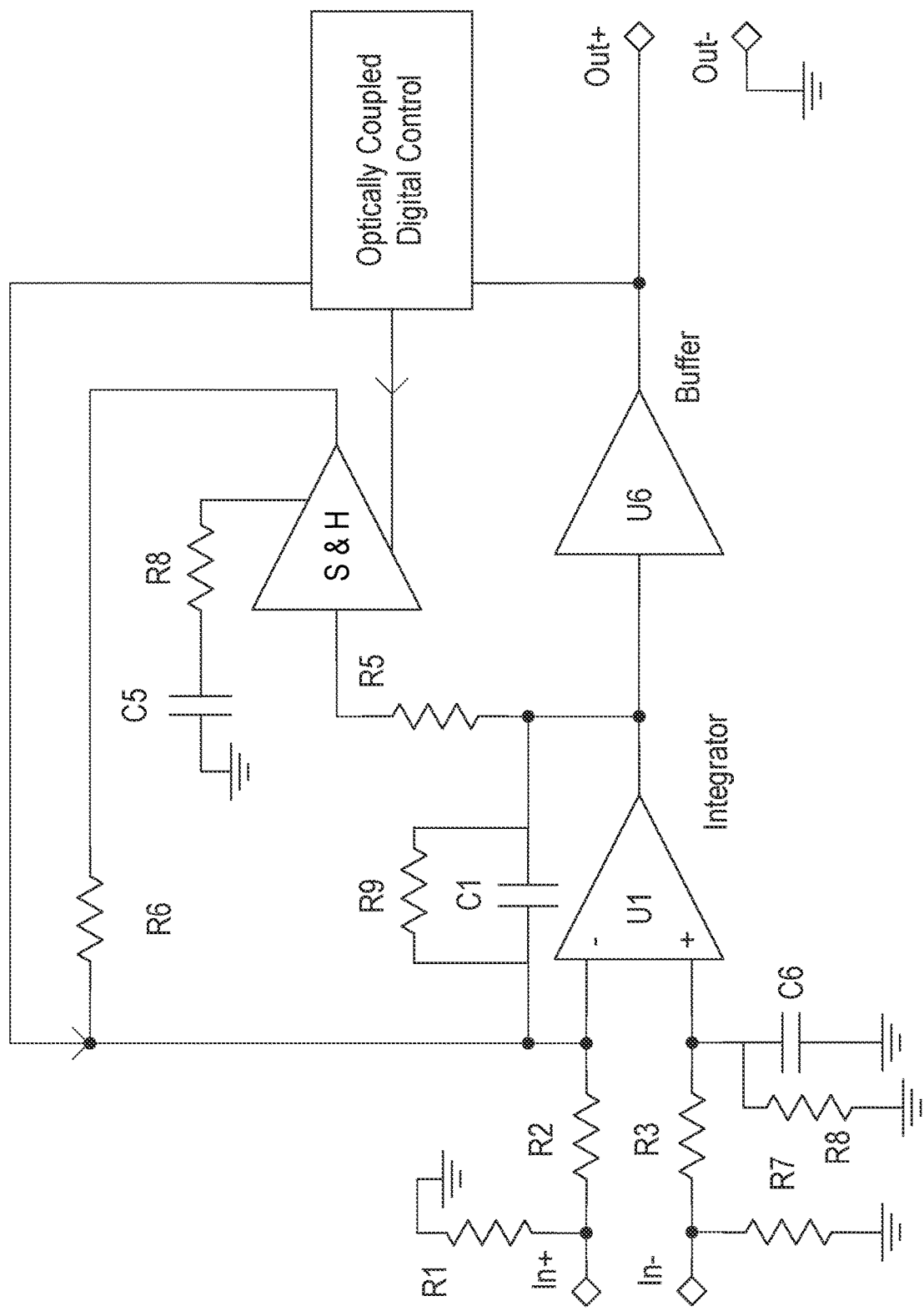
FIG. 1 is a circuit diagram of an integrator circuit according to some embodiments.

Systems and methods are disclosed to use eddy current NDE to detect flaws in a sample.

In some embodiments, an NDE device may be used to detect defects. The NDE device may include a component housing and/or a probe head coupled with a motor. In some embodiments, the component housing and the probe head may be coupled together. The motor may be configured to rotate the component housing a fixed or variable rotational speed. The probe head may include one or more permanent magnets and/or one or more pickup coils. The one or more pickup coils may include a plurality of loops of wire. As discussed in more detail, these pickup coils may detect magnetic fields induced within a sample at the site of a defect.

In some embodiments, the component housing may include one or more integrator circuits, a data acquisition unit, and/or a wireless transmitter. In some embodiments, the component housing may include one or more batteries. In some embodiments, the component housing may include one or more accelerometers, one or more rotation sensors, and/or one or more position sensors. In some embodiments, the component housing may also include a data storage and/or retrieval system such as, for example, flash, DRAM, SRAM, etc. In some embodiments, the component housing may include a processor such as, for example, a microprocessor, FPGA, etc. In some embodiments, the component housing may also include a rotating electrical interface such as, for example, a Mercury contactor or connector, that can allow data signals to be transmitted from the probe head and/or the component housing.

In some embodiments, the NDE device may be effective for surface crack detection and/or defect detection under surface layers and/or paints. Additional sensitivity can be obtained at high AC frequencies but deep measurements in metals are limited by skin depth penetration, which are well characterized for many materials. Several methods to increase measurement sensitivity for eddy current NDE, including direct measurement of the magnetic flux density using Hall sensors, giant magnetoresistive (GMR) sensors, and superconducting quantum interference devices (SQUIDS), have been attempted. High temperature SQUIDS have shown promise for NDE and provide very sensitive detection capabilities as low as 1 pT/Hz$^{1/2}$. Since skin depth is inversely proportional to the square root of the excitation frequency of the AC coil, the increased sensitivity of SQUIDS may allow for deeper flaw detection. Sub-surface flaws up to 10 mm in Al have been demonstrated. The disadvantage of SQUID-based NDE systems is the need to cool the probe head to cryogenic temperatures. This is true even for high temperature (77 K) SQUIDS, leading to complex and rather large probe heads not easily used for rapid investigation of various geometries needed for spacecraft NDE. However, the principle of using more sensitive magnetic probes demonstrates the potential ability to advance the method of eddy current NDE to allow for detection of deep subsurface cracks and corrosion.

Embodiments of the invention include a simple, robust, and low-cost method for making highly sensitive magnetic measurements with similar precision to SQUIDS but without the added complications of cryogenically cooled superconductors. Some embodiments may include methods for making sensitive magnetic measurements in noisy environments through the use of small inductive pick-up loops coupled to very high gain active integrator circuits. One possible advantage of this method is simplicity, since precision measurements of small-scale magnetic perturbations can be made using simple high gain active integrator circuits that may include operational amplifiers and passive circuit components. Inductive pick-up loops also work in high noise environments and in the presence of large magnetic fields that would render active measurement devices like Hall and GMR probes useless. Active integration may allow for signal gains on the order of $10^6$ or larger, which enables the measurement of very small signal levels.

In some embodiments, to convert the direct voltage measurements from the inductive pickup coil to a magnetic field measurement, the coil voltage may be integrated. In principle, direct integration of the signal should not pose a significant challenge, but in practice several factors make the integration difficult, especially when there are many orders of magnitude difference between the fast and slow magnetic signals and where high gain integrator circuits are being used. It is fairly easy to make a high gain integrator circuit stable over many RC times. For example, it is routine to make integrator circuits with gains of over $10^6$ (RC<1 µs) that can remain stable for up to millisecond timescales. However, the ability to keep high gain integrator circuits stable over millions or billions of RC times suitable long duration NDE measurements can be challenging. For NDE utilization, for example, it may be beneficial for the integrator circuit to remain stable during typical measurement periods, which can be characterized by the scan frequency of the NDE device. For deep defect detection, for example, slower scan frequencies may be needed to offset the skin depth effect with target scan speeds on the order of 10 Hz desirable for deep penetration. This may, for example, require integrator circuit stability for time periods on the order of seconds to minutes to ensure sufficient resolution, which may amount to tens of millions of RC times for gains necessary to measure defect induced eddy current perturbations.

Some embodiments include an ultra-stable high gain integrator (HGI). In some embodiments, an integrator circuit can take advantage of very fast (<10 ns) digital control. In some embodiments, when gated on, the integrator circuit may begin integrating. Then, on a regular interval set by an external clock, a processor may reset the integrator circuit back to zero output. An example integrator circuit is shown in FIG. 1. Other examples of a integrator circuits are described in U.S. Pat. No. 9,495,563, the contents of which are incorporated herein in its entirety for all purposes.

In some embodiments, the integrator circuit (and/or the sample and hold circuit reset) process may be very fast, for example, at speeds less than about 10 ms, 1 ms, 100 ns, etc. During this fast time interval, data may not be recorded, however, the fast time interval should be fast enough to allow signal measurements with a bandwidth of 5 MHz or greater, which should be sufficient for most applications and should be much faster than any relevant timescale necessary for an NDE device. The time between resets can, for example, be controlled by an external clock signal. During the fast time interval, for example, the integrator circuit may be gated on, and data may be output to the digitizer. The data may be recombined in software to produce the full signal. In some embodiments, the absolute error/noise may grow in time, but at a very slow rate. Since the integrator circuit can be reset on timescales fast compared to thermally induced drift and resultant instabilities, this error source can be significantly reduced. Random error/noise, which may always be present, can be reduced to approach its theoretical limits by decreasing time between resets.

In some embodiments, the integrator circuit may comprise a passive RC integrator that does not include, for example, any op amps or digital control elements.

In some embodiments, the integrator circuit may include multiple integrators that are stable on relatively short time scales, and that also may be utilized for relatively long time scale integration. Over long periods of time, for example, integrators may drift, which may result in integration error. To overcome this drift, among other things, the integrators may be switched between active and passive loads so that, while one integrator is integrating the active load, the other integrator may be reset when integrating the passive load. The resistance, inductance, and/or capacitance of the active load and the passive load may be identical or substantially identical (within 1%, 2%, 5%, or 10% of each other, or within manufacturing tolerances), while the active load provides a voltage and/or current signal and the passive load does not. In some embodiments, an additional circuit may be placed at the output of the integrator pair such that an output from multiple integrator circuit pairs may be averaged to achieve better or increased performance.

In some embodiments, the integrator circuit switches may be selected so that most or all charge injection and/or leakage currents are balanced, both during and between switching events. Accordingly, respective switches may be paired and balanced with each other. In part, this may be realized by the use of what would otherwise appear to be switches without purpose but are switching between a pair of resistors each tied to circuit ground. In some embodiments, all integrators, as well as, for example, the integrator input coil, may see identical input loads and/or output loads so, from the perspective of the integrators, those integrators do not respond or change states as if they normally would when being switched. Rather, everything is balanced and appears constant in time. Part of this may include balancing any delay(s) generated in gate/drive logic, and may involve the use of additional drive logic and gates that would otherwise appear to be without purpose.

Some embodiments may include an integrator circuit that enables a method for eddy current NDE with expanded detection depth over standard eddy current techniques. In some embodiments, the minimum magnetic field perturbation that can be detected with a integrator circuit can be determined as follows.

From Faraday's law:

$$V_{coil}(t) = \frac{d\Phi_B}{dt} = NA\frac{dB_\parallel}{dt},$$

where $\Phi_B$ is the magnetic flux, A is the area of a single loop in a coil, B is the magnetic flux through a single turn, N is the number of loops, and t is time. This equation can be integrated to obtain $$\int V_{coil}(t)dt = NA \int \frac{dB}{dt} dt = NAB.$$

The transfer function for an ideal integrator is $$V_{out}(T) = \frac{1}{RC} \int V_{coil}(t)dt = \frac{NAB}{RC},$$

where RC is the integration time constant of the integrator circuit and 1/RC is the gain. After the second equal sign, the equation for the integral of the coil voltage ($V_{coil}$) has been substituted. This equation can be rewritten $$B(t) = \frac{RC}{NA} V_{out}(t)$$

to determine the minimum detectable magnetic field that can be measured by this method. For example, a typical off-the-shelf data acquisition system operating at a reasonable signal-to-noise ratio may be able to detect signals of 1 mV or less. The disclosed integrator circuits typically operate with a gain of $10^6$ and can be operated with gains as high as $10^8$. In some embodiments, a coil for detecting defect sizes is on order of 0.5 cm², 0.75 cm², 1 cm², 1.25 cm², 1.5 cm², etc. but can be any size. It may be reasonable to make pickup coils with up to about $10^4$ loops (or turns). Combining these numbers into the equation above provides an estimate of the minimum measurable magnetic field of 1 nT, using a gain of $10^6$.

The actual minimum magnetic field that can be detected may be an order of magnitude smaller and/or may be achieved by operating at higher gain. Statistical methods could be employed and would likely increase the peak sensitivity by at least another order of magnitude through oversampling and averaging. More sensitive data acquisition systems may also improve the sensitivity by an order of magnitude or more. The integrator circuit's signal-to-noise ratio may be dominated by random noise, so it averages away. In some embodiments, the minimum field sensitivity may be on order of 10 pT, which may be comparable to the low temperature SQUIDs.

Figure 2:
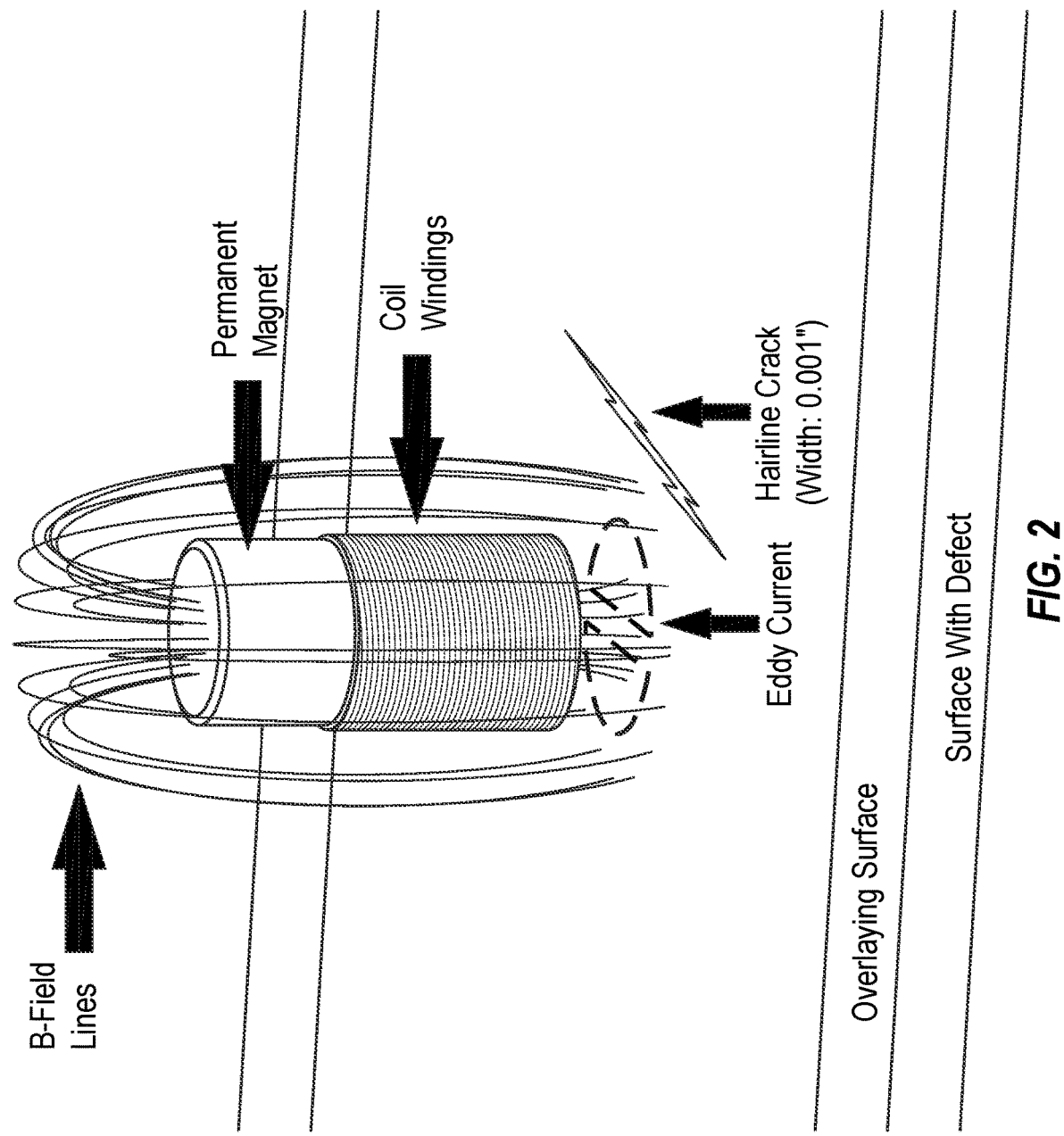
FIG. 2 is an illustration of an example NDE device with a permanent magnet and a high gain integrator circuit according to some embodiments.

The sensitivity of the disclosed integrator circuit can be compared to the magnitude of the magnetic field perturbation likely to be produced when detecting a defect to determine its potential as an NDE device. In the case where a permanent magnet is being moved over a conductive surface, such as a metal sheet, at a constant velocity, thus generating eddy currents in the metal sheet. As with standard eddy current measurements, changes in magnetic flux due to thickness changes, cracks, corrosion, and/or voids can be detected by the measurement coil. FIG. 2, for example, is a schematic of an NDE device based on a permanent magnet and a high gain integrator circuit. The permanent magnet field lines and eddy currents produced by the field's movement are also shown. The advantage of using the permanent magnet is that very large magnetic fields can be produced at very low cost with little complexity. Since the amplitude of the produced eddy current is proportional to dB/dt, the larger magnetic field also allows for lower scanning rates while producing similar signal amplitudes on the pickup coil. The lower frequency scanning can allow for deeper depth penetration into the metal. This coupled with the increased sensitivity of the integrator circuit, for example, may allow for much deeper detection depths with a very simple system.

Eddy currents may be induced in a conductive sheet by a moving permanent magnet. The penetration depth of the eddy currents is proportional to the skin depth of the material. Some embodiments may leverage the large magnetic fields of permanent magnets to reduce the required time rate of change of the flux and therefore significantly increases depth of penetration into the material. Once the NDE device velocity becomes constant there is no change in flux seen by a pickup coil unless there is a change in the material, which will modify the eddy current generation.

Figure 3A:
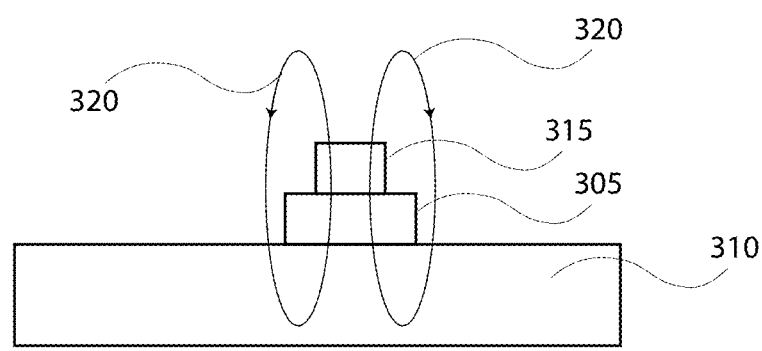
FIGS. 3A, 3B and 3C illustrate how changes in magnetic flux can be used to detect defects according to some embodiments.
Figure 3B:
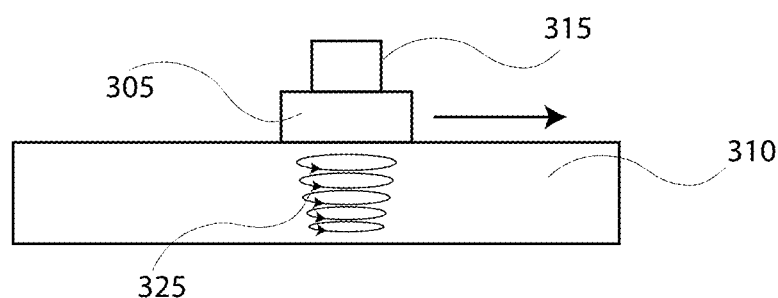
Figure 3C:
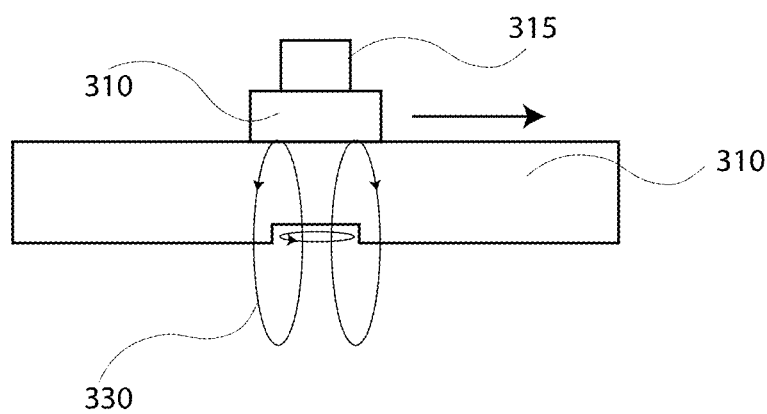

FIGS. 3A, 3B and 3C illustrate how changes in magnetic flux can be used to detect defects according to some embodiments. FIG. 3A shows a magnet and coil 305 on the surface of sample 310 with a constant velocity creating an opposing magnetic field. The magnet and coil 305 is coupled with an integrator circuit 315. Magnetic filed lines 320 are created by the magnet and no eddy currents are created in the sample 310.

FIG. 3B shows the magnet and coil in motion and eddy currents 325 created in the sample 310. FIG. 3C shows a defect in sample 310. As the magnet passes over the defect the eddy currents in the sample 310 change causing an opposing magnetic field 330. The pickup coil detects the opposing magnetic field 330 as a dipole 335.

In some embodiments, a high gain integrator circuit may be coupled with one or more permanent magnets moving over a conductive surface at a constant velocity. A pickup coil may be used with each magnet to measure changes in magnetic flux due to defects as shown in FIGS. 3A, 3B, and 3C.

The voltage that the integrator circuit will output due to a magnetic field perturbation may be:

$$V_{out}(t) = \frac{NAB_{dip}}{RC}, \quad (1)$$

where A is the area of a single loop in the pickup coil, N is the number of loops of wire, RC is the integration time constant of the integrator circuit, and $B_{dip}$ is the magnetic field strength due to the defect being approximated as a dipole.

In some embodiments, a defect can be approximated as a dipole because of the change in magnetic flux due to a change in eddy currents in the material. As a permanent magnet moves over a conducting surface, the induced eddy currents within the material will alter the magnetic field amplitude at the location of the pickup coil. The change in the magnetic field due to eddy currents everywhere in a material except for at the location of the defect, is equivalent to current being nowhere in the material and only in the defect. The former may be a dip in signal and the latter may be a peak in signal. Thus, the defect can be assumed as a dipole creating a magnetic field that is detected by a pickup coil.

The strength of the magnetic field due to an axially magnetized rod magnet along its symmetry axis can be calculated using, $$B_m = \frac{Br}{2} \left( \frac{h+z}{\sqrt{R_m^2 + (h+z)^2}} - \frac{z}{\sqrt{R_m^2 + z^2}} \right). \quad (2)$$

where Br, also called $Br_{max}$, is the residual flux density given for the magnetic material, h is the height or length of the magnet, $R_m$ is the radius of the magnet, and z is the distance away from the magnet. This equation can be used to calculate the strength of the magnetic field at the location of the defect. When the permanent magnet moves over a defect in the material, it is assumed that an opposing magnetic field will be produced due to the eddy currents in the material. The current required to produce the opposing magnetic field can be approximated using the Biot-Savart Law derived for a current-carrying loop, $$B = \int \frac{\mu_0}{4\pi} \frac{Idl\sin\theta}{r^2} = \frac{\mu_0 I}{2R_d}. \quad (3)$$

This equation can be rewritten, and substitute $B_m$ from equation 2 to determine the maximum current generated in the material due to eddy currents:

$$I_{max} = \frac{2R_d B_m}{\mu_0}, \quad (4)$$

where $R_d$ is the radius of the defect and $\mu_0$ is the permeability of free space. The following equation can be used to approximate the effective current at the location of the defect, $$I_{eff} = I_{max}\left(\frac{1}{3}\right)\left(\frac{D_d}{D_m}\right), \quad (5)$$

where $D_d$ is the thickness of the defect and $D_m$ is the thickness of the material. The ratio of defect thickness to material thickness is applied to account for the current flowing only through the defect, and not the current flowing through the whole thickness of material. To make this approximation, the magnetic field gradient may be assumed to be constant throughout the material, thus a simple ratio can be used to approximate the current only in a fraction of the material thickness. The factor of one third is applied to account for attenuation due to skin depth. The velocity of the magnet will be calculated so that the skin depth of the eddy currents is equal to the thickness of the material being tested. Since skin depth is defined as the depth at which the current density is approximately 1/e, about 0.37, of the surface current, then using a factor of one third in equation 5 is an approximation for the loss in current due to the depth of penetration. The equation used to calculate skin depth in a conductive material due to an electromagnet can be written as $$\delta = \sqrt{\frac{2\rho}{\omega\mu}}, \quad (6)$$

where p is the resistivity of the material, μ is the permeability of the material, and co is the angular frequency of the current. Since eddy currents will be induced via a moving permanent magnet, not an electromagnet, equation 6 can be varied to approximate the velocity at which the permanent magnet should move to achieve a desired skin depth. The velocity required to make the skin depth approximately equal to the material thickness can be called $v_{sd}$ and will be approximated as follows.

In equation 6, the angular frequency can be converted into frequency and then into a period:

$$\omega = 2\pi f = \frac{2\pi}{4T} = \frac{\pi}{2T}, \quad (7)$$

where T is the quarter period. A factor of one fourth can be applied after the second equals sign. By combining equations 6 and 7, the quarter period for a desired skin depth can be calculated using $$T = \frac{\delta^2 \pi \mu}{4\rho}. \quad (8)$$

The quarter period should be the time it takes for the eddy currents from a moving magnet to reach a desired skin depth. This can be seen by visualizing a sine wave, it only takes a quarter period for the wave to reach its first maximum, so the current will reach its maximum depth in only one fourth of the period. The magnet can be moved at a velocity that allows the eddy currents enough time, T, to reach the skin depth before the magnet's diameter has completely swept over that specific surface area of material. Thus, the velocity can be approximated as $$v_{sd} = \frac{d_m}{T}, \quad (9)$$

where $d_m$ is the diameter of the permanent magnet being swept over the surface.

If the operating velocity of the magnet, $v_o$, is not equal to $v_{sd}$, then another factor, $v_{sd}/v_o$, can be applied to equation 5. Skin depth decreases with increase in velocity. This factor accounts for the change in current density at the depth of the defect due to a change in velocity of the permanent magnet. By changing the velocity of the probe head, the depth of the defect can be mapped out as long as maximum depth of measurement for any particular probe diameter and velocity follows equation 9.

In some embodiments, the defect acts as a dipole with a current value, $I_{eff}$, calculated from equation 5. The dipole can create an additional magnetic field which can be detected by a pickup coil back at the surface of the material. The equation for the magnetic field due to a dipole may be $$B_{dip} = \frac{\mu_0}{4\pi r^3}[3(m\cdot\hat{r})\hat{r} - m], \quad (10)$$

where r is the radial distance from the center of the dipole, or defect, and m is the magnetic moment.

The magnetic field on axis for permanent magnet is well known but no solution exists for the magnetic field off axis created by a permanent magnet. An analytic solution for the field strength of a physical magnetic dipole may be known. The permanent magnet, for example, may be assumed to be a simple current loop of radius a. In cartesian coordinates the z-component of the magnetic field may be given by the following equation.

$$B_z = \frac{\mu_0 I}{2\pi}[(a+x)^2 + z^2]^{-\frac{1}{2}}\left[K + \frac{a^2 - x^2 - z^2}{(a-x)^2 + z^2}E\right]$$

Where K and E are solutions of the complete elliptic integrals of the first and second kind, respectively and given by the following expansions.

$$K = \frac{\pi}{2}\left(1 + \frac{k^2}{4} + \frac{9}{64}k^4 + \ldots\right),$$

$$E = \frac{\pi}{2}\left(1 - \frac{1}{4}\frac{k^2}{1} - \frac{9}{64}\frac{k^4}{3} - \ldots\right)$$

The substitution parameter is written as follows:

$$k^2 = \frac{4ax}{(a+x)^2 + z^2}$$

With the magnetic field component of interest as a function of (x,z) the eddy current generated can be calculated by the defect once the pertinent time scale is defined. From Faraday's law, the magnet can be swept past the defect very quickly to maximize the time rate of change of magnetic flux through the defect. In some embodiments, the skin depth may have a greater attenuating effect at higher speeds. The skin depth may be defined as the depth at which the current density is approximately 1/e of the surface current and the equation used to calculate the skin depth in a conductive material due to an electromagnet may be:

$$\delta = \sqrt{\frac{2\rho}{\omega\mu}}.$$

Where $\rho$ is the resistivity of the material, $\mu$ is the permeability of the material, and $\omega$ is the angular frequency of the current. Since eddy currents may be induced by a moving permanent magnet, not a pulsed electromagnet, the velocity at which the permanent magnet should move to achieve a desired skin depth can be approximated. For a conductive material of some thickness defined by h, the velocity required to make the skin depth equal to the material thickness can be approximated as follows.

Let $T_r$ be the quarter period such that, $$\omega = 2\pi f = \frac{2\pi}{T} = \frac{2\pi}{4T_r}$$

The quarter period may be the time it takes for the eddy currents from the moving magnet to reach a desired skin depth. This can be seen by visualizing a sine wave, it only takes a quarter period for the wave to reach its first maximum, so the current will reach its maximum depth in only one fourth of the period. This means the magnet should be moved at a velocity that allows the eddy currents enough time to reach the skin depth before the magnet's diameter has completely swept over that specific surface area of material. Thus, the skin depth velocity can be approximated as $$v_{sd} = \frac{R_m}{T_r}.$$

Where $R_m$ is the radius of the magnet being swept over the surface and the quarter period can be written as function of the material thickness because $\delta = h$ at skin depth velocity $v_{sd}$.

$$T_r = \frac{h^2 \pi \mu}{4\rho}$$

As the skin depth is the location in a conductive material at which the magnitude of the surface field decreases by 1/e then this attenuation must be applied to the z-component of the dipole magnetic field when that field is swept at velocity $v_{sd}$. If the operating velocity of the magnet, $v_o$, is not equal to $v_{sd}$, the factor $(e^{-(v_o/v_{sd})})$ may be applied to the scanning magnetic field.

Figure 4:
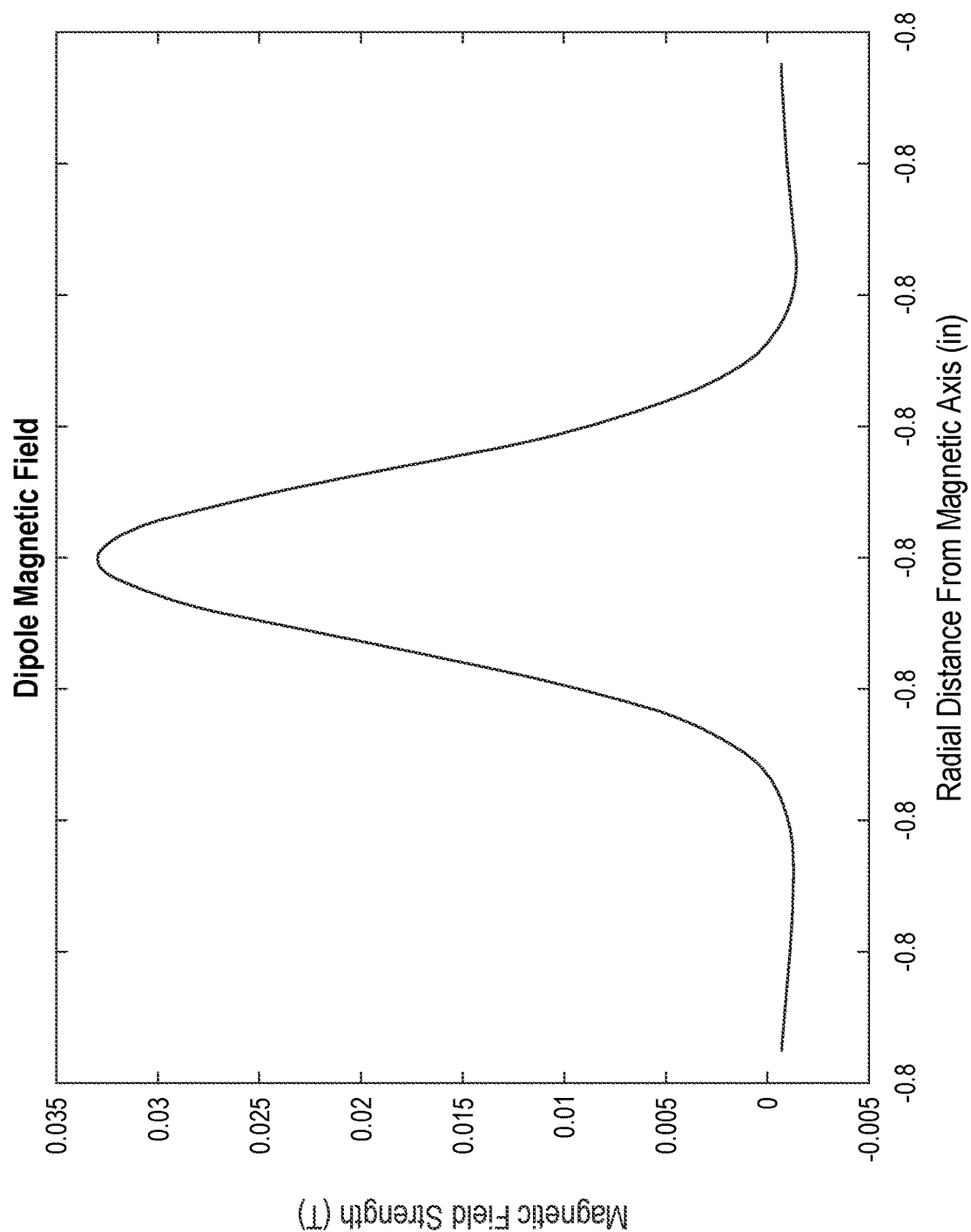
FIG. 4 is an example plot of the magnetic field strength at a depth of ¼" in aluminum created by a ¼" diameter physical dipole moving at the ¼" skin depth velocity according to some embodiments.

To estimate the voltage on a pickup coil, due to a small defect in a conducting material, moving with the scanning magnet, the magnetic field at the defect may be calculated. FIG. 4 is an example plot of the magnetic field strength at a depth of ¼" in aluminum created by a ¼" diameter physical dipole moving at the ¼" skin depth velocity. To elucidate the effect that changes to a given parameter (e.g., defect size, defect depth, operating velocity, etc.) has, the maximum magnetic field strength located on axis at the surface is normalized to 1 T, for example, regardless of the magnet size.

Figure 5:
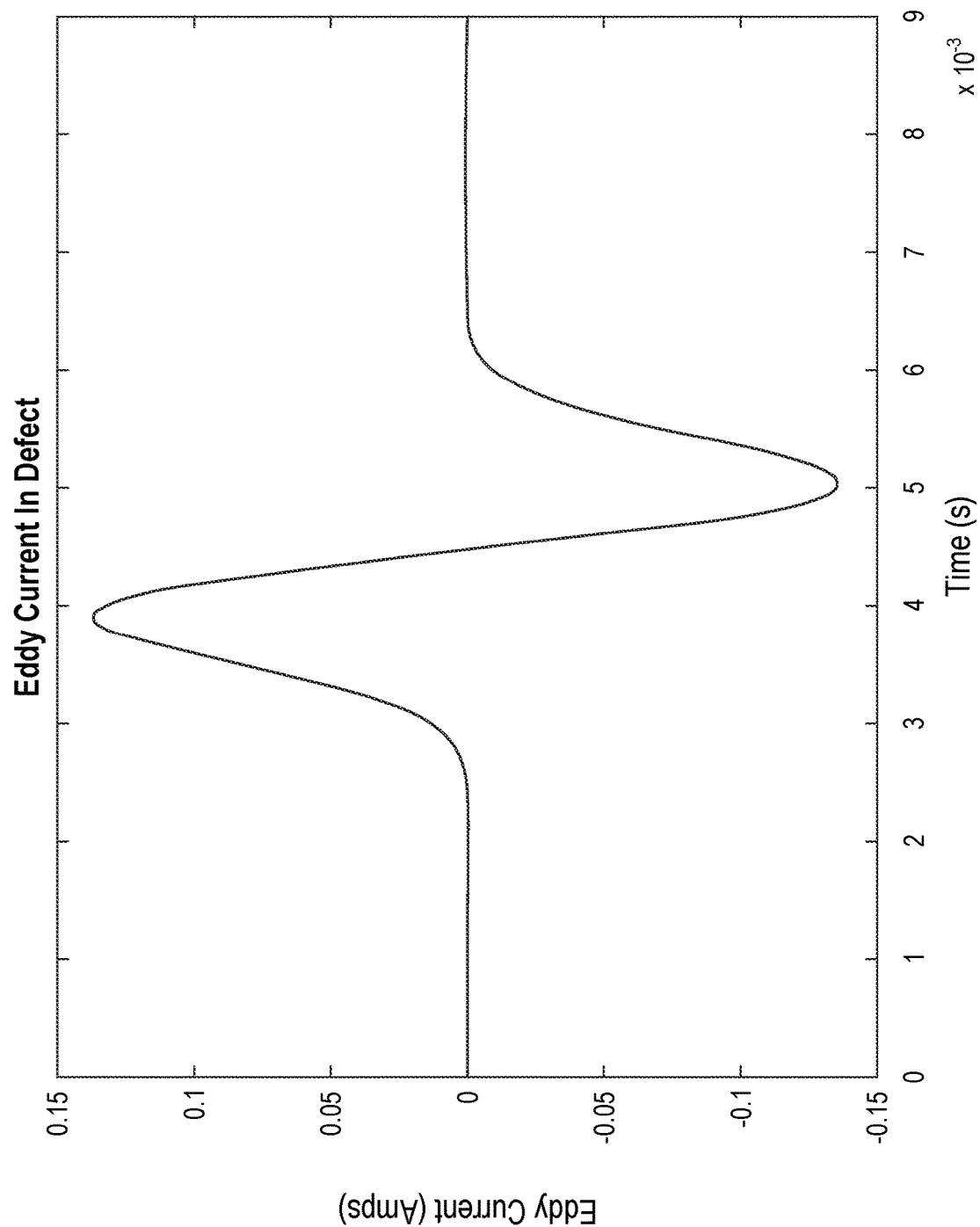
FIG. 5 is an example plot showing the defect eddy current as a function of time according to some embodiments.
Figure 6:
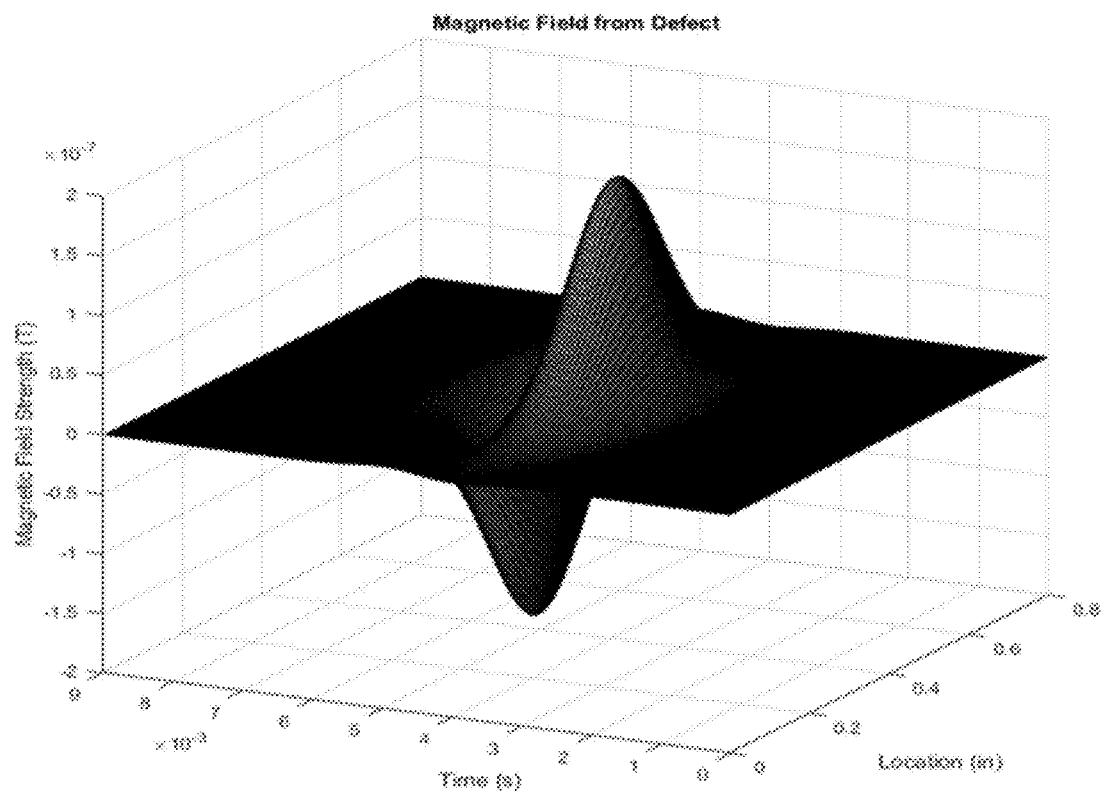
FIG. 6 is an example plot of the magnetic field versus both time and location of a defect according to some embodiments.

In some embodiment, the electromagnetic induction at the defect can be calculated from the magnitude of the magnetic field and the speed at which the magnet is moving using Faraday's law. This electromotive force drives a current in the vicinity of the defect. Determining the magnitude of this current may be difficult. It can be assumed, for example, that the current flows in a ring around the defect and/or the cross-sectional area of that current ring is equivalent to half the area of the defect. The length of the current ring can be assumed to be the circumference of the defect plus the radius of the current ring. This can enable an estimate of the resistance in the current ring. The actual current may then be calculated from Ohm's law. Although the area of the defect can be used to calculate the voltage around the defect, an additional attenuation factor can be applied to the defect current to account for the diminishing pickup coil signal strength as the defect size decreases. In some embodiments, this can be a weighted attenuation factor which is essentially the integral of the section of the dipole magnetic field directly over the defect at a given time divided by the total integral of the dipole field. In some embodiments, as the magnet sweeps over the defect, a new section of the dipole magnetic field curve, like the one shown in FIG. 4, may be integrated. This value can be divided by the total integral of the magnetic field curve which is then applied to the current around the defect. In some embodiments, this can result in a substantial attenuation and/or it may yield results similar to measured values. In one example, the defect eddy current as a function of time is shown in FIG. 5. Once the defect eddy current is determined, for example, the resultant dipole magnetic field can be calculated as shown in FIG. 6.

Figure 7:
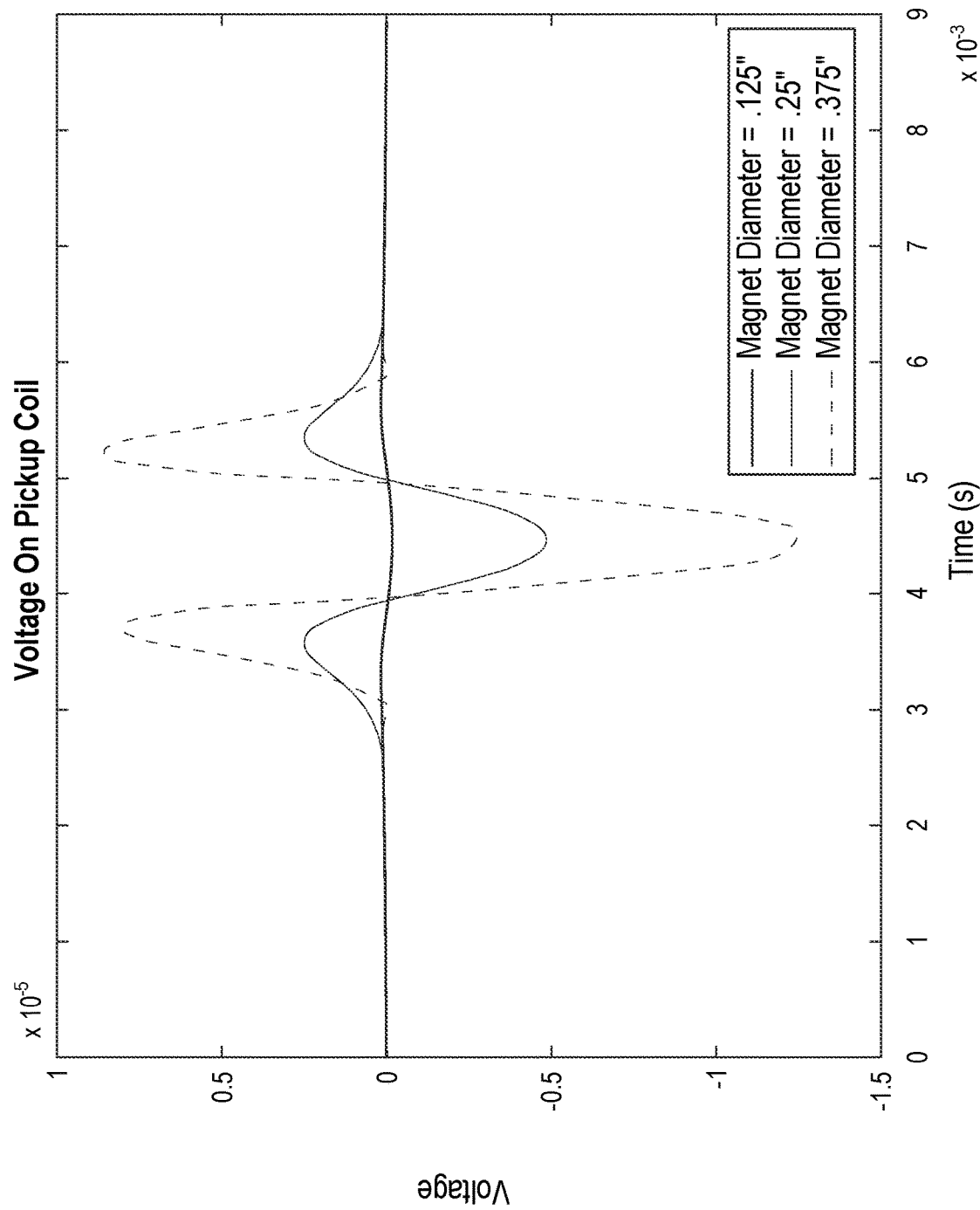
FIG. 7 is an example plot showing a larger magnet may generate a greater voltage according to some embodiments.

In some embodiments, the voltage on the pickup coil that is swept with the magnet can be calculated using Faraday's law from the estimated magnetic field from the defect. In some embodiments, a larger pickup coil may receive a greater induced voltage. In some embodiments, a larger diameter magnet may generate a greater signal on the pickup. In some embodiments, the estimated voltage on a ¼" diameter pickup coil with 300 turns, for example, is shown in FIG. 7 for a 0.10" diameter defect with a height of 0.050" located 0.25" below the surface of a solid aluminum plate. FIG. 7 shows that a larger magnet may generate a greater voltage on the pickup coil.

Figure 8:
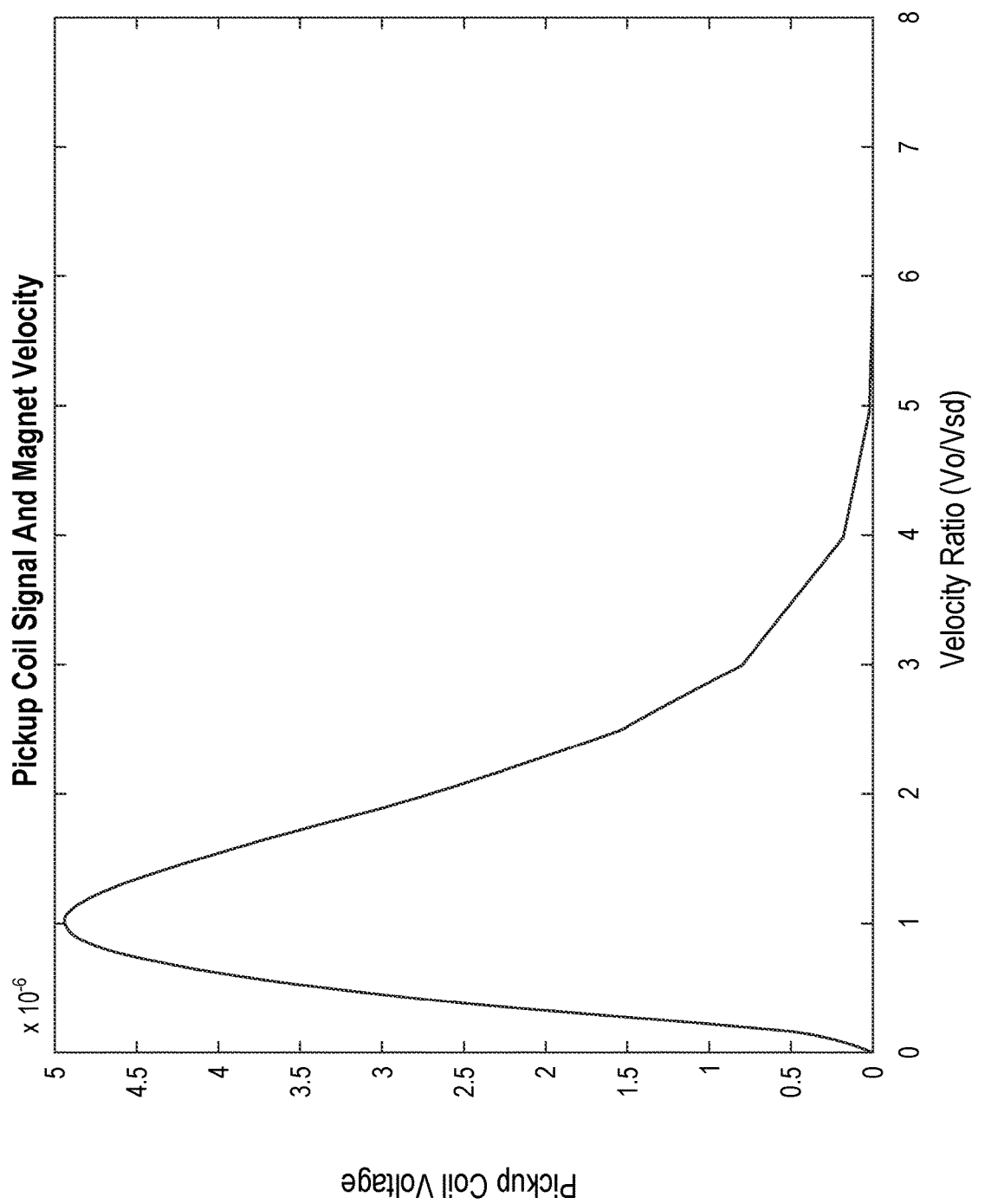
FIG. 8 shows the pickup coil voltage as a function of probe sweep velocity according to some embodiments.

FIG. 8 shows the pickup coil voltage as a function of probe sweep velocity according to some embodiments.

Figure 9A:
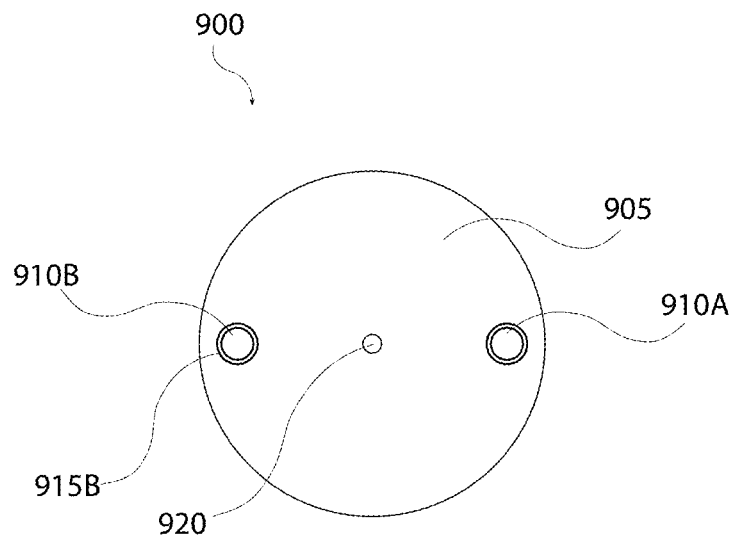
FIG. 9A is a top view of a rotating head of a precision eddy current NDE device according to some embodiments.
Figure 9B:
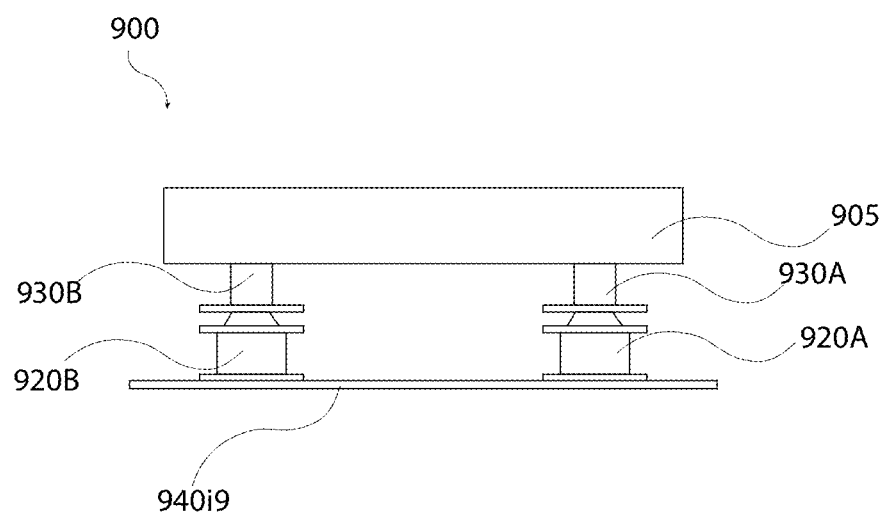
FIG. 9B is a side view of a rotating head of a precision eddy current NDE device according to some embodiments.

FIG. 9A is a top view of a rotating head 900 of a precision eddy current NDE device according to some embodiments. FIG. 9B is a side view of a rotating head 900 of a precision eddy current NDE device according to some embodiments. The rotating head 900 may include a disc 905 that includes permanent magnets 910A, 910B. The rotating head 905 may have a translational stage that can be used to move the rotating head 905. The rotating head 905, for example, may comprise an aluminum disc. The rotating head 905 may include two permanent magnets 910A, 910B disposed on opposite sides of the disc 905 (e.g., glued to the disc), for example, along a diameter of the disc 905. In some embodiments, the permanent magnets 910A, 910B may include bobbins glued to the outer surfaces of the disc 905. In some embodiments, the permanent magnets 910A, 910B may include a pickup coil 915A, 915B (e.g., a 30 AWG pickup coil) wound around each respective permanent magnets 910A, 910B. Each of the two permanent magnets 910A, 910B with a pickup coils may be coupled with or within a probe head body.

For example, two permanent magnets 910A, 910B may be glued to the disc 905 on opposite ends of a diameter. In some embodiments, the permanent magnets 910A, 910B may include a bobbins 930A, 930B and pickup coils 915A, 915B. In some embodiments, the pickup coil 915A, 915B may not be glued with the rotating head 905. In some embodiments, for stability, an empty bobbin may be attached to the side of the permanent magnet facing the disc 905 that may result in a wider glue base. In some embodiments, a second disc 940 (e.g., ⅟16" polycarbonate disc) may be attached (e.g., glued) on the other side of the permanent magnets 910A, 910B where the coil is disposed.

Figure 10:
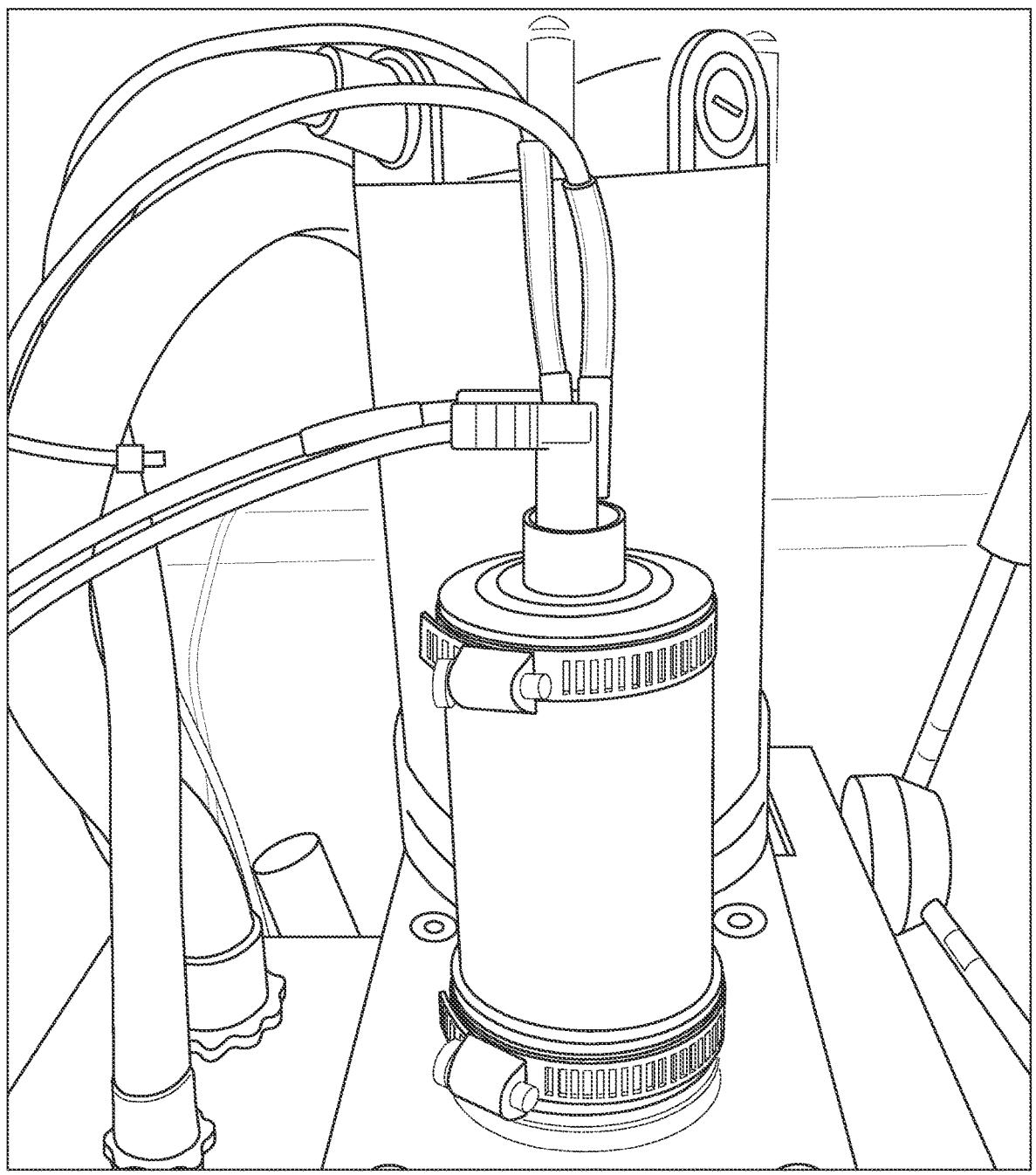
FIG. 10 is a photograph of an example eddy current NDE device according to some embodiments.

FIG. 10 is a photograph of an example eddy current NDE device. The eddy current NDE device may allow for a controlled, adjustable rate of rotation, and/or may allow the material samples clamped relative to the probe head for a stable configuration during prototype testing. Additionally, it may allow for the vertical distance between the probe head and the material sample to be precisely controlled.

Figure 11:
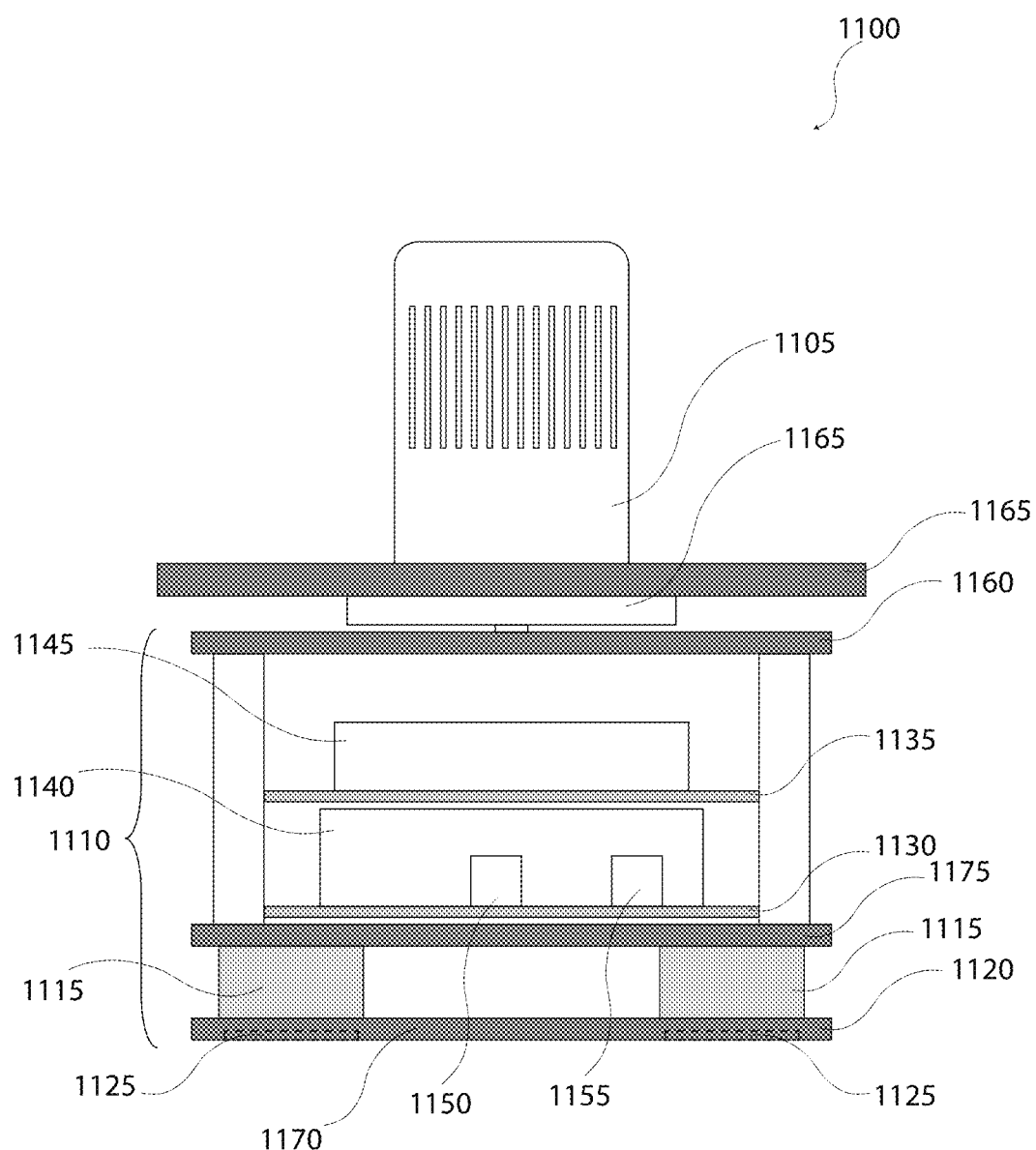
FIG. 11 illustrates an assembly of an example NDE device according to some embodiments.

FIG. 11 illustrates an assembly of an example NDE device 1100 according to some embodiments. NDE device 1100 includes a rotating body 1110 coupled with motor 1105. The rotating body 1110 may be a probe head.

A permanent magnet moving over a conductive surface generates eddy currents in the material that may counteract the changing magnetic flux. The magnetic fields created by the eddy currents in the material produces a force that pushes against the oncoming magnet in the front and pulls at the magnet as it is moving away. These forces are both in the direction opposite the motion of the magnet, and the result is known as eddy current braking. The motor 1005 may be selected to counteract any eddy current braking such as, for example, the Nanotec Electronic brushless electric motor model DB42M02 or model DB42C01, which are small, lightweight, and rotate at a high speed.

In some embodiments, the motor 1105 may rotate the rotating body 1110 at a known rotation rate. In some embodiments, motor 1105 may spin at speeds up to 500 RPM, 1000 RPM, 2000 rpm, etc.

In some embodiments, the rotating body 1110 may include one or more permanent magnets 1115. In some embodiments, the one or more permanent magnets 1115 may include a Neodymium magnet or any other type of permanent magnet or electromagnet. In some embodiments, the one or more permanent magnets 1115 may have a 0.25" diameter, but this diameter may range from 0.01" to 2". The one or more permanent magnets 1115 may have any shape such as, for example, cylindrical, rectangular, toroidal, etc.

In some embodiments, the rotating body 1110 may include one or more pickup coils 1125. The one or more pickup coils 1125, for example, may be wound by hand or by machine, and/or may have one or more turns, up to several thousand. In some embodiments, the one or more pickup coils 1125 may be wrapped around the magnet or bobbin. In some embodiments, the one or more pickup coils 1125 may be mounted near the one or more permanent magnets 1115. In some embodiments, the one or more pickup coils 1125 may be fixed relative to the one or more permanent magnets 1115 when the rotating body 1110 is rotating. In some embodiments, the one or more pickup coils 1125 may not be fixed with respect the one or more permanent magnets 1115 when the rotating body 1110 is rotating.

In some embodiments, each of the one or more pickup coils 1125 may include any number of loops of wire such as, for example, between 20 and 3000 loops of wire or between 200 and 2000 loops of wire, or between 500 and 1000 loops of wire. In some embodiments, each of the one or more pickup coils 1125 may include 0.25" diameter 40 AWG magnet wire looped or wound around a bobbin or the permanent magnets 1115.

In some embodiments, the one or more pickup coils 1125 and the one or more permanent magnets 1115 may be coupled with the bottom portion of the rotating body 1110.

In some embodiments, the motor 1105 may include a precision brushless electric motor (e.g., a model DB42M02 and/or a model N5-2-3 motor controller from Nanotec Electronic Inc.). Use of a brushless motor, for example, may reduce any noise pickup on the signal of interest since brushless motors may produce lower levels of electromagnetic interference than brushed electric motors.

Figure 12A:
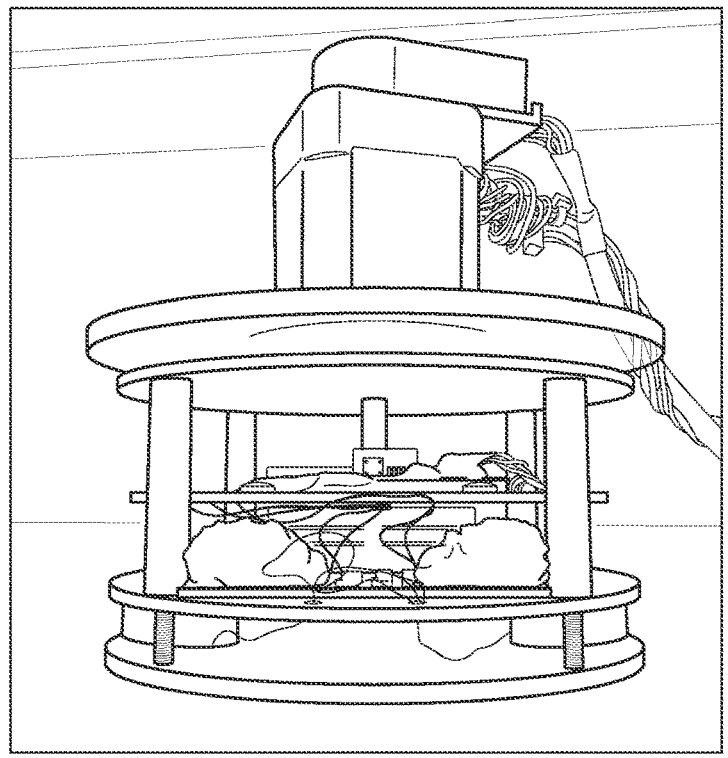
FIG. 12A is a picture of example NDE electronics according to some embodiments.
Figure 12B:
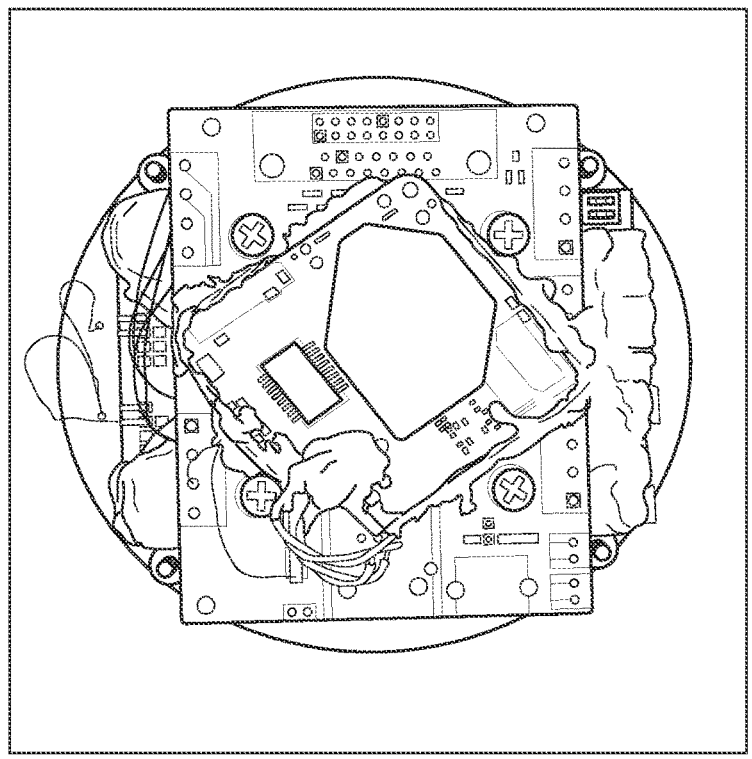
FIG. 12B is a picture of an NDE device without a shroud according to some embodiments.
Figure 13A:
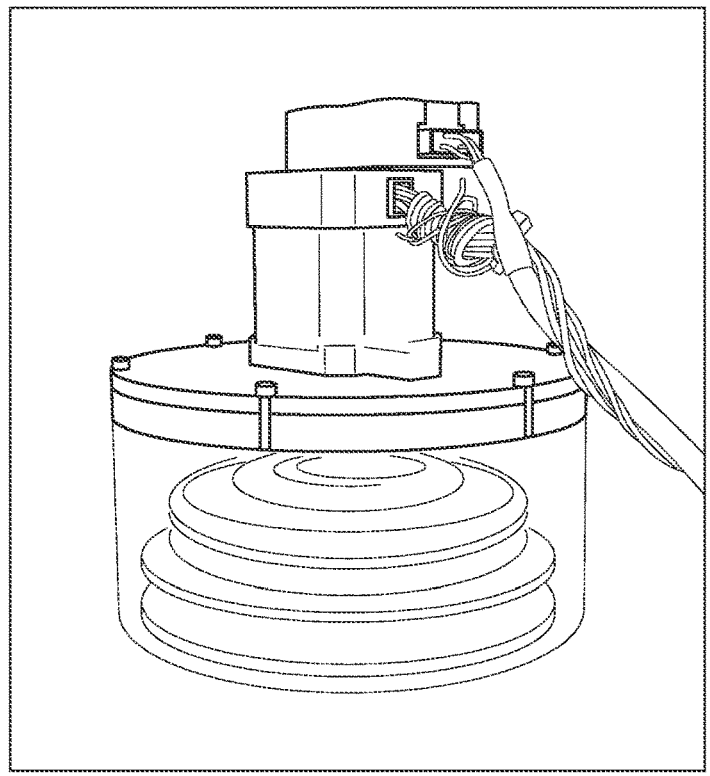
FIG. 13A is a picture of a fully functional NDE device according to some embodiments.
Figure 13B:
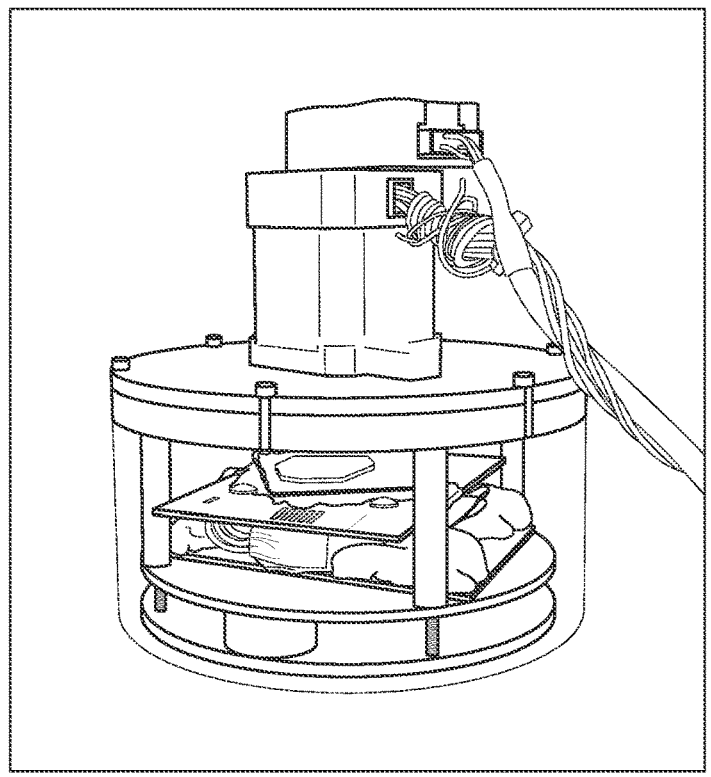
FIG. 13B is a picture of the fully functional NDE device spinning at 1000 RPM according to some embodiments.

In some embodiments, the rotating body 1110 may include various electronics that are mounted separately from the one or more permanent magnets 1115 and/or the one or more pickup coils 1125. In some embodiments, some of the electronics may be disposed on a nonconductive (e.g., polyimide) plate 1175, which may separate the electronics from the one or more permanent magnets 1115 and/or the one or more pickup coils 1125. These electronics may include, for example, an integrator circuit 1130, a wireless transmitter 1145, batteries 1140, digital storage, a microprocessor, a data acquisition unit 1135, etc. In some embodiments, the integrator circuit 1130 may include a two-channel, ultra-stable high gain integrator circuit such as, for example, those produced by Eagle Harbor Technologies. An example integrator circuit is shown in FIG. 1. FIGS. 12A, and 12B are photographs of example electronics.

In some embodiments, the data acquisition unit 1135 may receive analog integrated voltage signals from the integrator circuit 1130. In some embodiments, the data acquisition unit 1135 may include an analog to digital converter that may digitize analog integrated voltage signals from the integrator circuit. In some embodiments, the data acquisition unit may detect 20 µV per step per reading. In some embodiments, the digitized integrated voltage data may feed into a microprocessor and/or transmitted wirelessly via the wireless transmitter.

In some embodiments, the integrator circuit 1130 may not be used. Instead, the data acquisition unit 1135 may receive and/or record voltage data directly from the pickup coils.

In some embodiments, the rotating body 1110 may also include a wireless transmitter 1145 that may be used to communicate data from the rotating body 1110 to an external device. In some embodiments, the wireless transmitter 1145 may include Wi-Fi bridge circuit. In some embodiments, the wireless transmitter 1145 may include Bluetooth circuitry.

In some embodiments, the rotating body 1110 may include batteries 1140, rotational sensor 1150, and/or various other electronics. In some embodiments, the batteries 1140 may power the various electronics within the rotating body 1110. In some embodiments, the batteries 1140, for example, may include lithium polymer, 250 mAh batteries. In some embodiments, the batteries may be coupled with battery charging connectors. In some embodiments, the battery charging connectors may be attached to one side of the integrator circuit 1130 or rotating housing or shroud.

In some embodiments, the rotational sensor 1150 (e.g., accelerometer) that may record the degree of rotation of the motor. The angle of rotation may be saved with the integrated voltage data to ensure the angle of rotation of the integrated voltage data is recorded, which can be translated into spatial data relative to the sample or another fiducial.

In some embodiments, the rotating body 1110 may include positional tracking system (e.g., a laser system) that may give it spatial awareness.

In some embodiments, the rotating body 1110 may be disposed within a nonrotating shroud. In some embodiments, the shroud may comprise a shatter-resistant polycarbonate material. In some embodiments, the shroud may be designed to protect the components of the rotating body 1110 while in operation. In some embodiments, the shroud may also protect the device from direct contact with the test material under evaluation.

In some embodiments, the data acquisition unit may be coupled with the integrator circuit and/or the wireless transmitter.

In some embodiments, leads from the various electronics can be connected to an electrical rotary connector. This may be used in lieu or in conjunction with a wireless transmitter. Since the signal may be very small, a low noise electrical rotary connector may be used. For example, the electrical rotary connector may include a Mercotac Model 430 unit. A picture of the mount setup is shown in FIG. 10. In this example, the top of the electrical rotary connector may protrude from the mount piece and/or may have stationary wires, which may carry the voltage signal to a high gain integrator circuit.

The NDE device may include a rigid spinning assembly that houses the electronics and/or batteries and the probe head, which contains the magnets and pickup coils. A polycarbonate shroud, not shown in FIG. 11, 12A or 12B, may attach to the shroud support and/or provide support for the motor and spinning assembly and/or may isolate the moving frame from contact with stationary objects. The motor, motor mount, shroud, and/or shroud support may be stationary and/or allow the operator to handle the probe safely. The spinning assembly may be rigid, light, and/or balanced about the motor shaft. The frame of the spinning assembly may be constructed from 6061 aluminum, and/or brass fasteners may be used to minimize the distortion of the magnetic field.

In some embodiments, the motor shaft attachment, the first disk below the motor mount in FIG. 12B, may be press fit onto the motor shaft. While the motor shaft extends 21 mm from the bottom of the motor, the shape of the motor may be such that the shaft extends 24 mm from the motor mounting location. Thus, the motor shaft attachment part is designed to press fit over the bottom 0.725" of the motor shaft for maximum alignment and stability. The four large extension rods are screwed to the motor shaft attachment, and the probe head with the magnets and pickup coils are mounted to the end of the extension rods. The extension rods are center bored to the cutting diameter for #6-32 UNC threads to reduce weight. This design allows for easily changing the probe head to characterize different magnet and pickup coil sizes and configurations.

In some embodiments, a two-channel dip switch may be included. The electronics for this initial NDE device may be activated by simply setting the sliders in the dip switch to the on position. When the device is not in use or it needs to be charged, the dip switch sliders may be set to off.

Other embodiments may use other methods to generate the needed velocity/motion of the permanent magnet and/or the pickup coils relative to the sample. This may include linear or reciprocating motion either along the plane of the surface or perpendicular to the plane of the surface. Other embodiments may include motion of a non-motorized probe head by hand by a technician. Yet other embodiments may include a stationary probe head/assembly, with a sample that is moved relative to it, for example for NDE of materials that are being unrolled/extruded/etc. such as wires, pipes, tubes, etc. In other embodiments, a miniaturized version of the probe may be dropped or guided through narrow tubes, holes, pipes, etc.

In some embodiments, the magnet and the pickup coil may be physically attached and co-moving. This simplifies the mathematics of reconstructing the defect shape and location. In other embodiments, it may be advantageous to locate the magnet and pickup coil separately. Alternatively, the magnetic fields could be generated by other means, such as an electromagnet, current flow through the sample, or other means.

In some embodiments, there may be multiple pickup coils. Multiple pickup coils may allow for improved spatial resolution or reduced scanning time. In other embodiments, a single pickup coil may be optimal to allow for the smallest possible probe design. The size of the pickup coil may be varied to adjust the sensitivity of the system to defects of varying sizes and at varying depths.

In some embodiments, the output data may be dominated by a large sinusoidal signal due to the movement of the magnet and pickup coil relative to the Earth's (or any other) magnetic field as the probe head is moved. Various schemes may be used to eliminate or reduce this sinusoidal signal. For example, two matched coils connected differentially (e.g., opposite polarity, opposite sides of the rotating disk) can be used to cancel out the sinusoidal signal. As another example, the sinusoidal signal can be removed mathematically in post-processing. A sinusoidal signal like this, for example, can be extracted by removing the relevant frequency components with an FFT, since the timescale of the probe head's rotation is slower than the timescale associated with passing over a small defect feature.

In some embodiments, the very sensitive nature of the pickup coil can pose problems. For example, due to its proximity to the motor and other moving parts, the motor operation could also be detected by the coil. As another example, coupling to the long output cables going from the coil to the integrator circuit may induce more features into the signal that were not related to the sample being studied. These problems can, for example, be addressed by improving the shielding and/or grounding of the setup.

One of the advantages of the rotating probe head, for example, may be the ability to mitigate signal noise by averaging the output of many rotations together. For example, if the probe head is rotated at 100-400 rpm, then scanning for several tens of seconds generates on the order of one hundred samples. These samples, for example, can be synchronized together and/or averaged to allow the real signals to be amplified while the noise and random components can be averaged out. This may improve the signal to noise ratio.

Figure 14A:
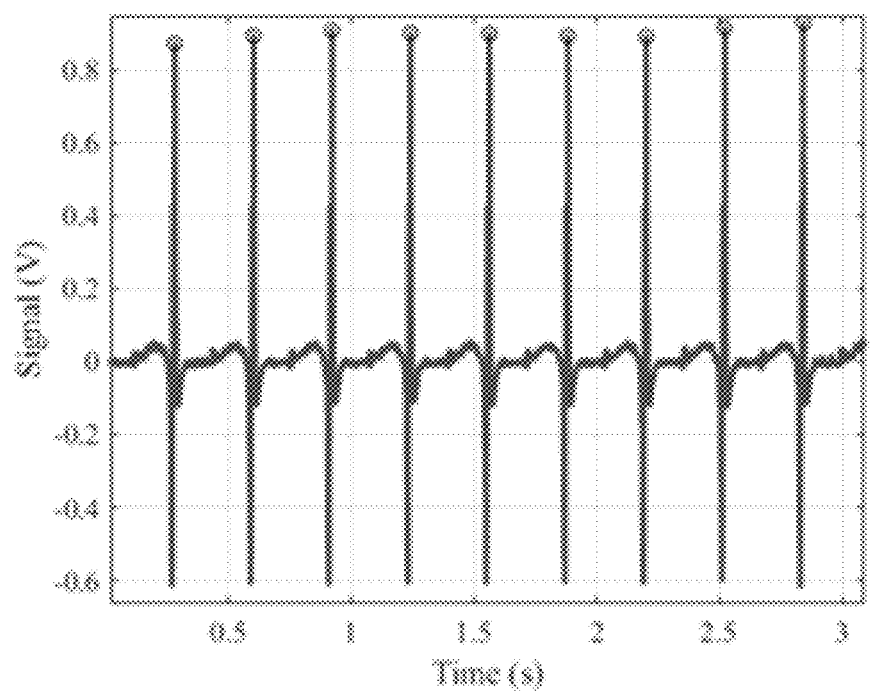
FIG. 14A is a plot showing the repetitive waveform nature from a rotating tool according to some embodiments.
Figure 14B:
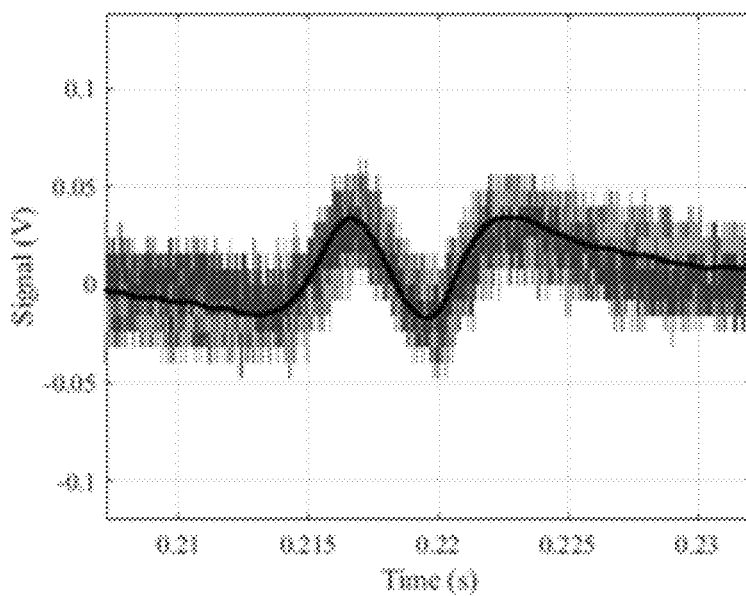
FIG. 14B is a plot showing signal to noise improvements according to some embodiments.

As shown in FIG. 14A, the raw data may include a repetitive waveform, with each repetition corresponding to one rotation. To synchronize the repetitive waveforms, all of their peaks may be lined up. The largest signal, for example, may be from a fiducial feature. The fiducial feature may, for example, be a non-rotating object (e.g., a metal object) placed close to the probe head. A fiducial, for example, may be a metal object placed on the sample plate near the probe head. Alternately or additionally, the fiducial could be a metal object built into the probe head. The fiducial, for example, may be located at a fixed location relative to where the magnet and/or pickup coil pass on each turn such as, for example, on the probe head housing or shroud or placed on the sample under test. The use of the fiducial may, for example, be useful to help ensure that the signal from each rotation can be aligned (e.g., precisely aligned) to enable statistical averaging of many rotations together. Other techniques could also be used to synchronize the signals from each rotation such as, for example, measuring the rotation mechanically or optically and processing this information together with the signal. In some embodiments, using the fiducial may allow information to be processed with just a single channel of data acquisition. The resulting signal to noise improvement is shown in FIG. 8B. The different colored traces show the data from each individual pass, while the black line is the averaged data. This technique, for example, may greatly improve the signal to noise ratio, allowing the method to detect smaller perturbations corresponding to smaller defect sizes.

In some embodiments, the integrator circuit inside the NDE device head may include a droop effect which may be achieved by placing a droop resistor across the integration capacitor, shown in the integrator circuit shown in FIG. 1 (R8 and R9). This droop effect can be used to achieve long duration stability of the integrator circuit. The droop RC timescale can be set, for example, to be longer than the RC integration timescale but shorter than the rotation timescale. For example, the integration RC timescale might be 10 μs, the rotation timescale might be 50 ms (1200 rpm), and the RC droop timescale might be 500 μs. In this case, any background effects such as the Earth's magnetic field or the curvature of a curved sample that is being scanned would be subjected to droop, eliminating their contribution to the output signal, while the signal of interest (abrupt edges of cracks, small holes, etc.), would be detected.

Figure 15:
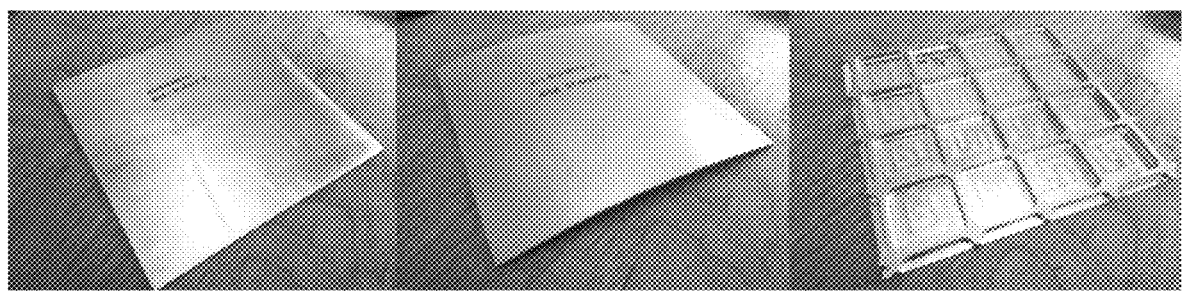
FIG. 15 is an image of various NDE testing standards.

In some embodiments, an NDE device can be tested using a variety of test samples as well as NDE standards provided by NASA (shown in FIG. 15). These test samples may, for example, include flat aluminum plates of varying thicknesses with through holes of varying sizes. These test samples may, for example, include a flat aluminum plates of varying thicknesses, with holes of varying sizes going part way through the thickness (e.g., not all the way through). These test samples may, for example, include Aluminum plates set side by side, so that the boundary between the two plates forms a "crack". In some embodiments, the NDE device head may also be tested with other samples including flat plates and sheets, pressure vessels, tubes, pipes, rods, extrusions, and non-uniform structures.

These test samples may, for example, include rib-stiffened plates, represented by a typical geometry from Russian International Space Station (ISS) hardware with a small-rib wall separation (~3-inch square, 1/16-inch thin wall). This wall type is found on the Russian SM (Zvezda) and FGB (Zarya) modules. In the case of the SM, the waffle pattern was on the inside of the module; for the FGB, the pattern was on the outside of the module. Standard 1A had flaws generated on the waffle side of the plate, while Standard 1B had the flaws place on the smooth side. To emulate cracks and pits in the FGB and SM standards, EDM notches 0.100 inch long and either 0.010 or 0.020 inch deep were manufactured. To emulate pits, partial through-the-thickness holes were drilled with a 3/64-inch-diameter drill to depths of 0.010 and 0.020 inch. These flaws were mostly located adjacent to the ribs of the waffle pattern.

These test samples may, for example, include a flat aluminum 3/16-inch plate that contained a row of EDM notches two inches from one edge and a row of partial through-the-thickness holes 2 inches from another edge. The EDM notches may range from depths of 0.025 to 0.125 inch and lengths of 0.032 to 0.094 inch. The holes had diameters of 1/32 to 3/32 inch and depths of 0.025 to 0.100 inch.

These test samples may, for example, include plates with a radius of curvature of 25 inches. The purpose of these standards was to demonstrate the ability of the NDE method to correctly handle the small radii of curvature found in some parts of the ISS modules.

The flat plates are relatively simple to evaluate as the probe head can be placed close to the surface and maintain a constant separation distance throughout the scan. This was accomplished with simple flat plates produced by the sample flat plates. For the curved plate, difficulties arise because the probe head is not small compared to the scale of the plate's curvature. Therefore, as the magnet and pickup coil rotate around the axis of the probe head, their distance relative to the plate will change. This will impose a large sinusoidal signal on the output. However, this signal can be ignored since its timescale will vary significantly from any expected defects, as with the sinusoid due to the Earth's magnetic field described above. The other issue imposed by the plate's curvature is that the probe head will be farther away from the plate's surface through much of its rotation, attenuating the output signal. Therefore, it is simply a matter of verifying that there is still a sufficient signal to noise ratio to detect the defects of interest.

The ribbed plate posed the greatest difficulty because the plate is fundamentally not uniform. As the probe head rotates over the surface, the ribs and rib intersections will each generate unique signals, which will overlay with the signals arising from any defects. Without an accurate simulation of the expected signal as a function of the sample geometry, the simplest way to try to identify defects is to scan a defect-free reference plate at the exact same location and save that signal, then subtract it from the signal obtained from scanning a plate with a suspected defect. Any difference between the test signal and the reference signal will therefore correspond to a defect, but it will be necessary to have accurate reference data at each location where the sample is to be evaluated. Alternatively or additionally, in some embodiments, if the spatial resolution of the NDE device can be made high enough, it may be possible to image the plate and simultaneously see the ribs in the plates as well as defects near them.

Bench testing included scanning for simple through hole defects, scanning for divots as in the NDE sample plates, scanning for cracks, and evaluating the effect of rotation speed on defect detection depth.

Figure 16:
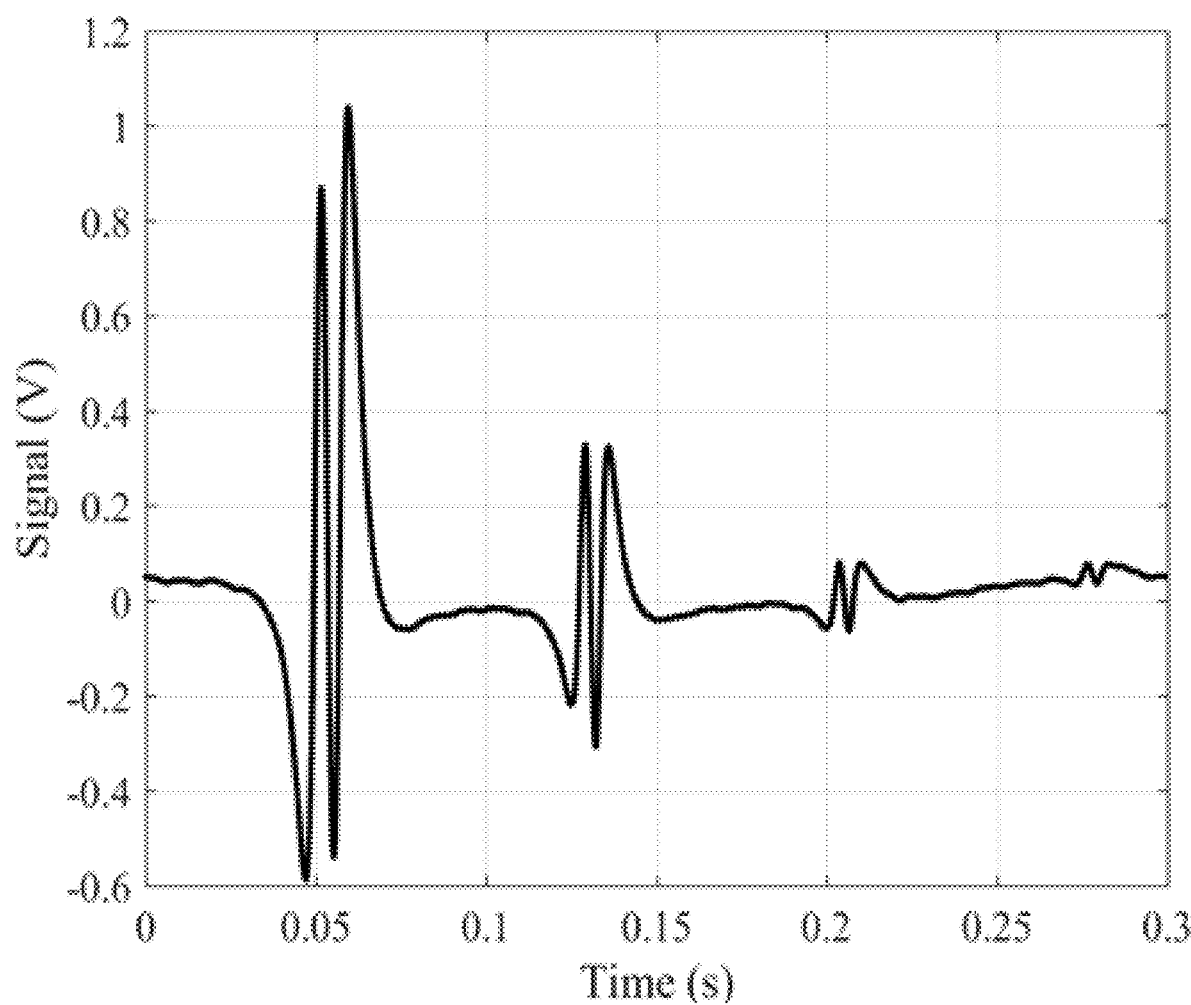
FIG. 16 shows a waveform where the probe head was passed over a ¼", ⅛", ¹⁄₁₆", and ¹⁄₃₂" hole in succession according to some embodiments.

Through hole defects, along with cracks, are among the easiest kind to detect since they generate the largest signals. Therefore, through holes were the first type of defects that were used to test the system. The signal amplitude changes both as a function of the hole diameter and the plate thickness. FIG. 16 shows a waveform where the probe head was passed over a ¼", ⅛", ¹⁄₁₆", and ¹⁄₃₂" hole in succession.

Figure 17A:
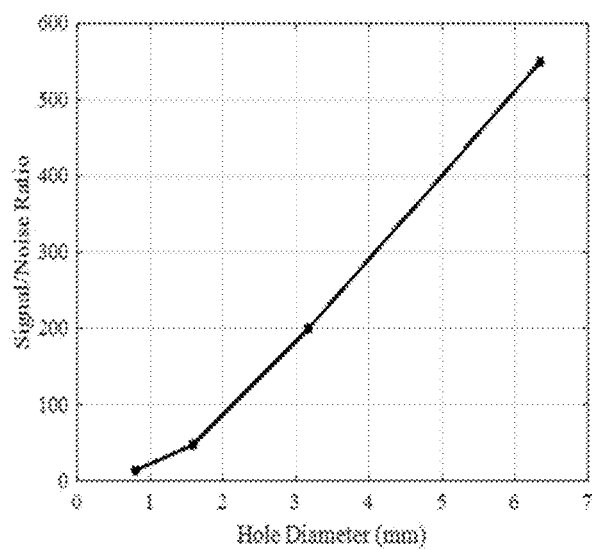
FIG. 17A and FIG. 17B show the scaling of the signal-to-noise ratio as a function of the hole size and the plate thickness according to some embodiments.
Figure 17B:
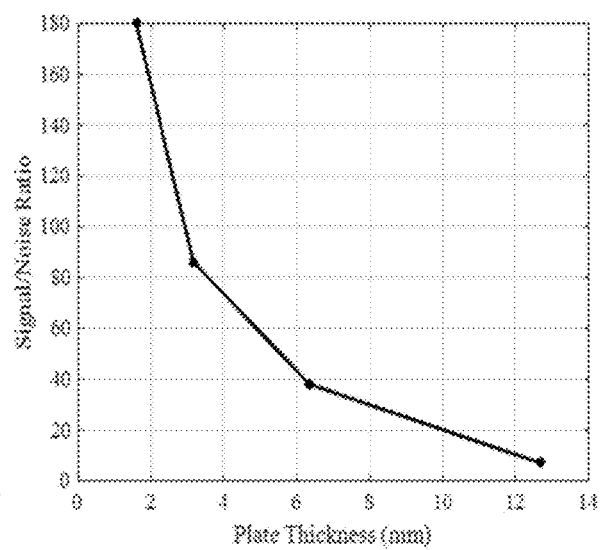

The plots in FIG. 17A and FIG. 17B show the scaling of the signal-to-noise ratio as a function of the hole size and the plate thickness. Clearly, larger holes are easier to detect than smaller ones.

Reduced signal-to-noise ratio occurs with thicker plates. While the signal amplitude remained approximately constant regardless of plate thickness, the observed noise increased greatly with thicker plates. The source of the noise remains uncertain; however, it could be that the noise is not really "noise" but real signals resulting from variations/imperfections in the plate material, which have a greater impact for a thicker plate. This effect can be investigated further and may be useful in determining impurity or thickness variations in the manufacturing process.

Figure 18:
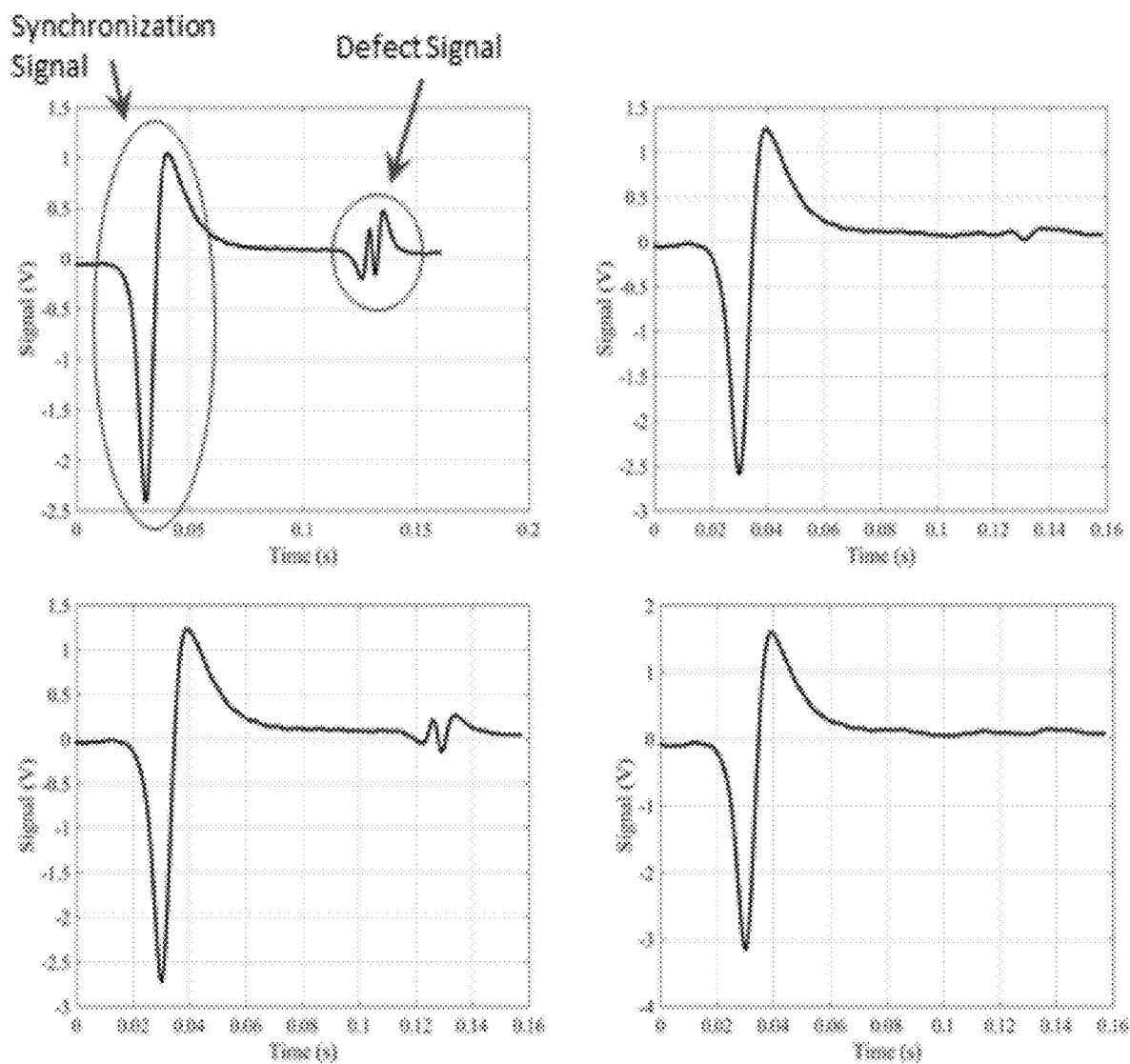
FIG. 18 includes four plots showing how a defect signal scales with the depth according to some embodiments.
Figure 19:
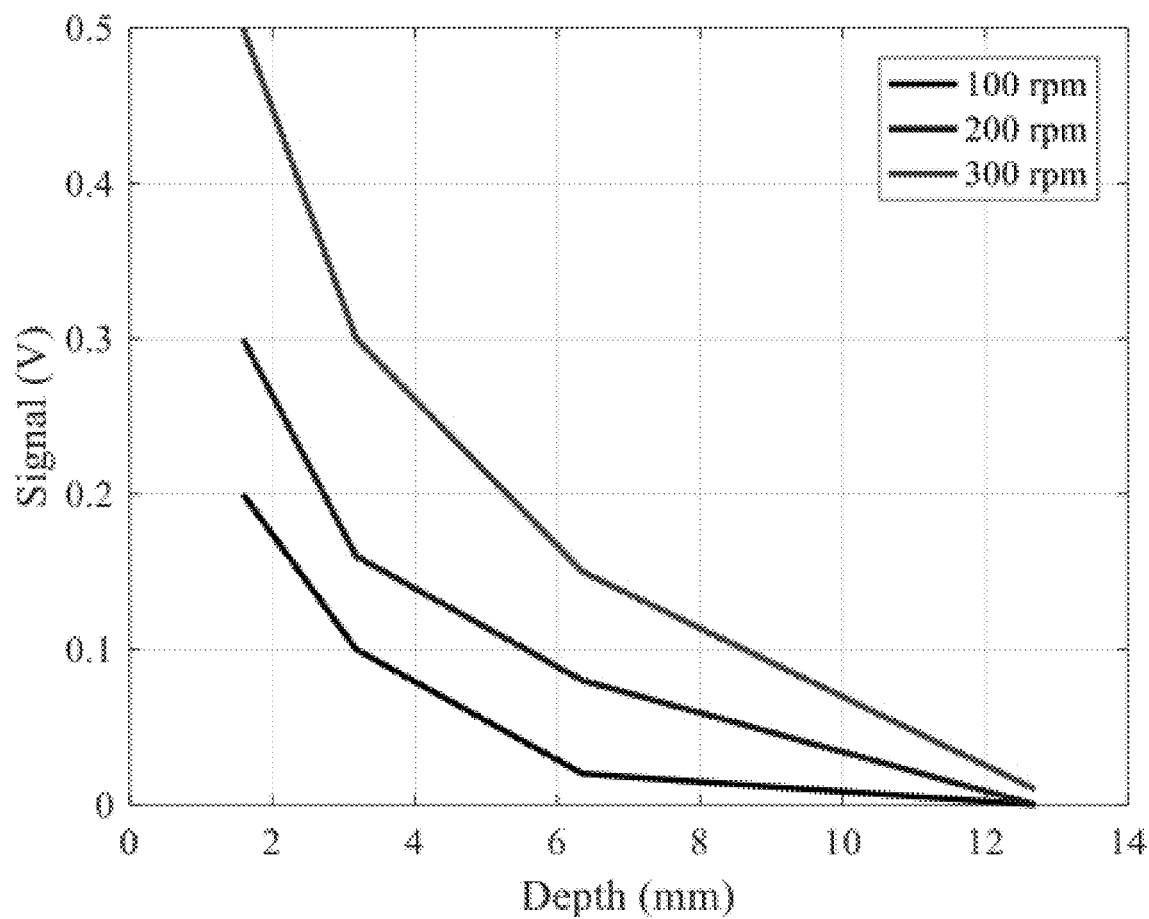
FIG. 19 is a plot showing the scaling of signal amplitude as a function of the defect depths in the plate according to some embodiments.

Waveforms showing how a defect signal scales with the depth is shown in FIG. 18. The large synchronization signal in each waveform is a detection of a fiducial used for synchronization, which may be held at a fixed position relative to the probe head. The smaller feature later in time is a defect. In some embodiments, the defect signal can have a progressively smaller amplitude for deeper depths. FIG. 19 is a plot showing the scaling of signal amplitude as a function of the defect depths in the plate.

In some embodiments, there may be a dependence on the rotation rate of the probe head. For example, faster rotation rates generate larger signals due to the increased dB/dt while background noise and effects may have a fixed amplitude, thus improving signal to noise ratio. Faster rotation rates may generate larger eddy currents. However, as the rotation rate is increased, eventually the magnetic fields may not be able to penetrate all the way through the material due to the skin depth limitation. By adjusting the rotation rate, the probe head can sweep through a range of depths that the signals are able to penetrate, providing information about the defect depth and/or the thickness of the sample as shown in FIG. 20.

Figure 20:
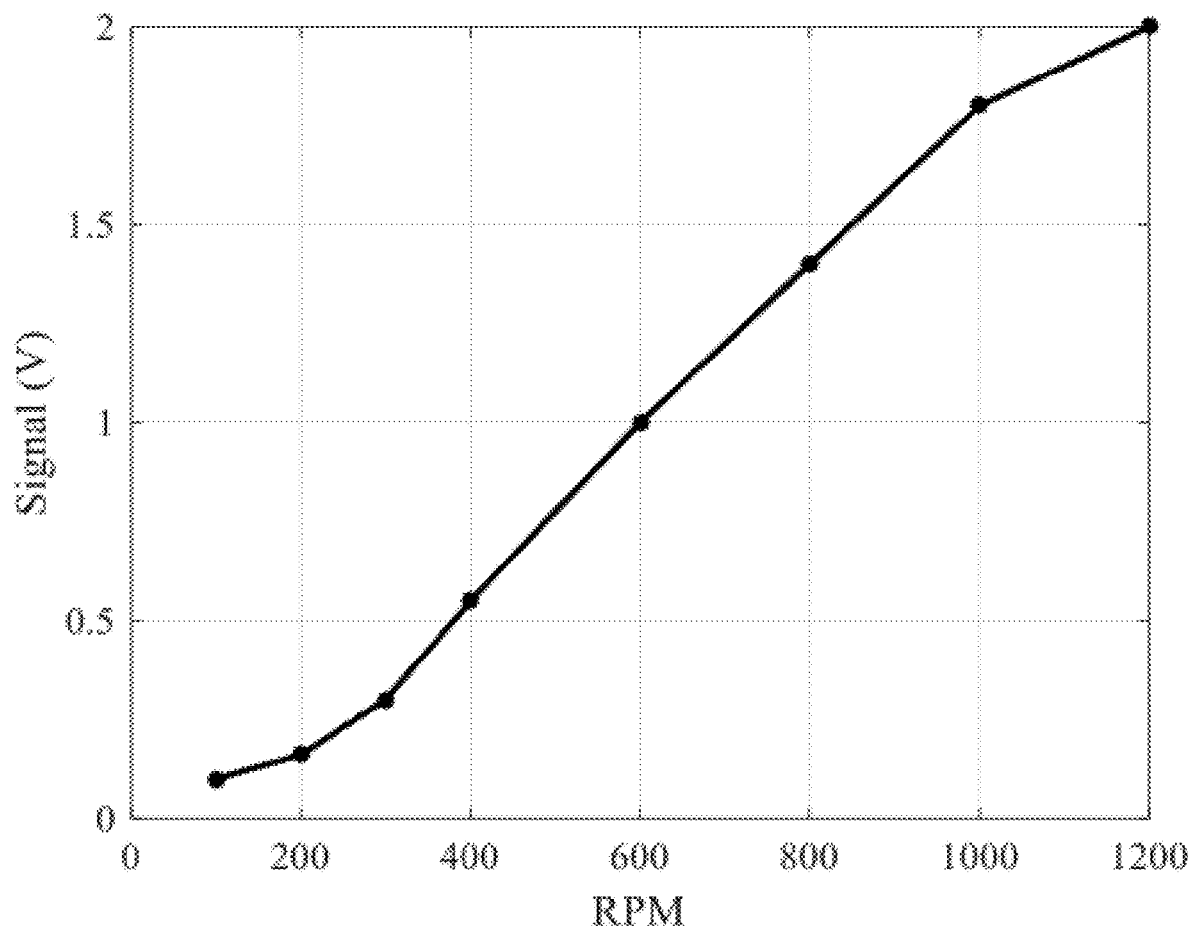
FIG. 20 is an example plot that shows the effect of rpm on signal size for through hole defects according to some embodiments.

FIG. 20 is a plot that shows the effect of rpm on signal size for through hole defects. It may be possible to achieve greater rotation rates (e.g., up to 4000 rpm or more) by improving probe head balance and/or avoiding the use of a mercury contactor by either storing data locally onto an SD card on the probe head and then retrieving it afterwards or by transmitting the data wirelessly as it is collected.

Figure 21:
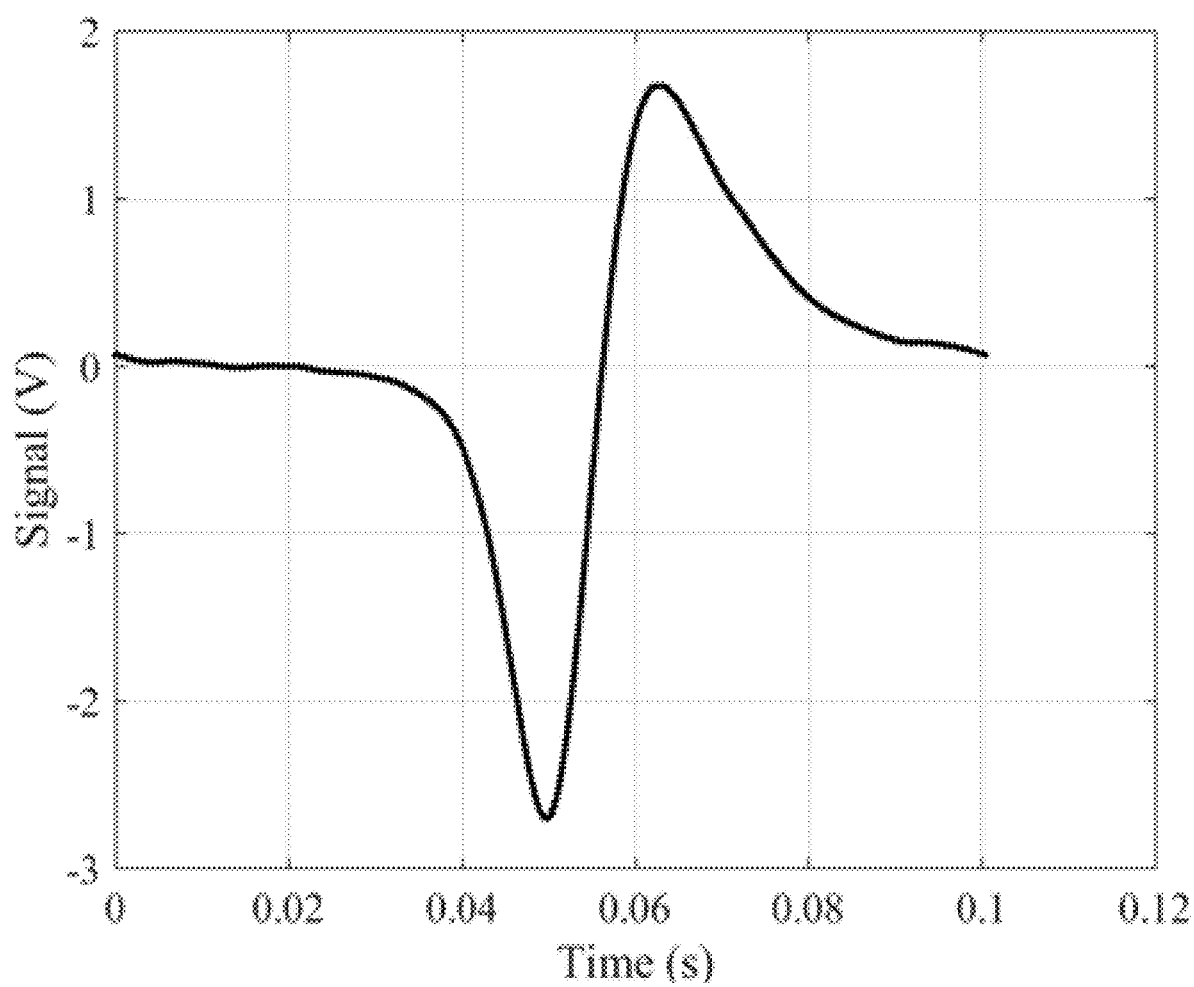
FIG. 21 shows an example plot of a crack detected in a sample according to some embodiments.

FIG. 21 shows an example plot of a crack detected in a sample according to some embodiments. The signal waveform when passing over a hole defect looks like approximately 2 periods of an oscillation, while the waveform when passing over the crack is more like 1 period.

Figure 22:
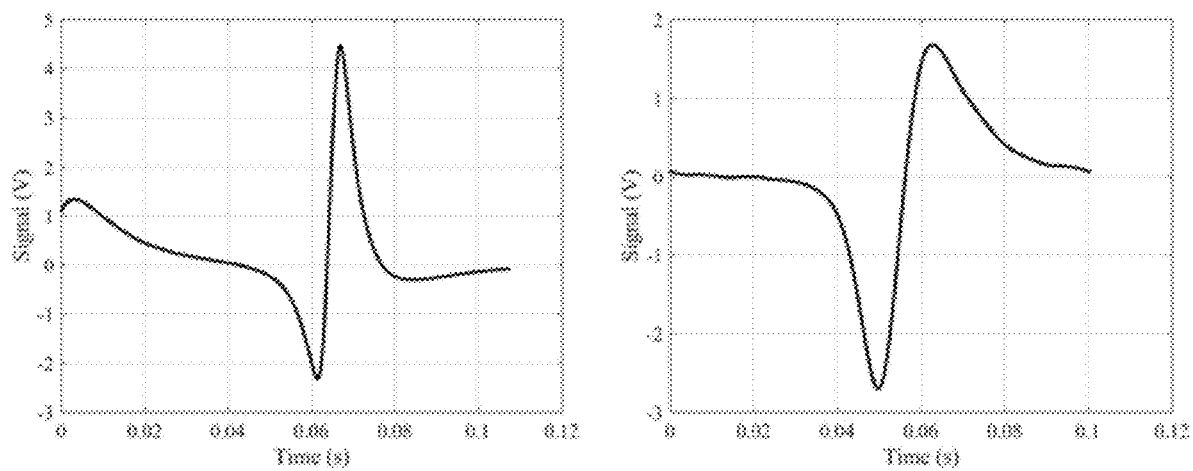
FIG. 22 shows two example plots of a crack detected in a sample according to some embodiments.

FIG. 22 shows two example plots of a crack detected in a sample according to some embodiments. The plot on the left shows the detection of a crack defect measured at the sample surface. The plot on the right shows the detection of a crack through a ½" thick Aluminum plate. As shown in this example, going from detecting the crack at the sample surface to detecting the crack through a ½" plate reduced the signal amplitude by less than a factor of 2.

Figure 23:
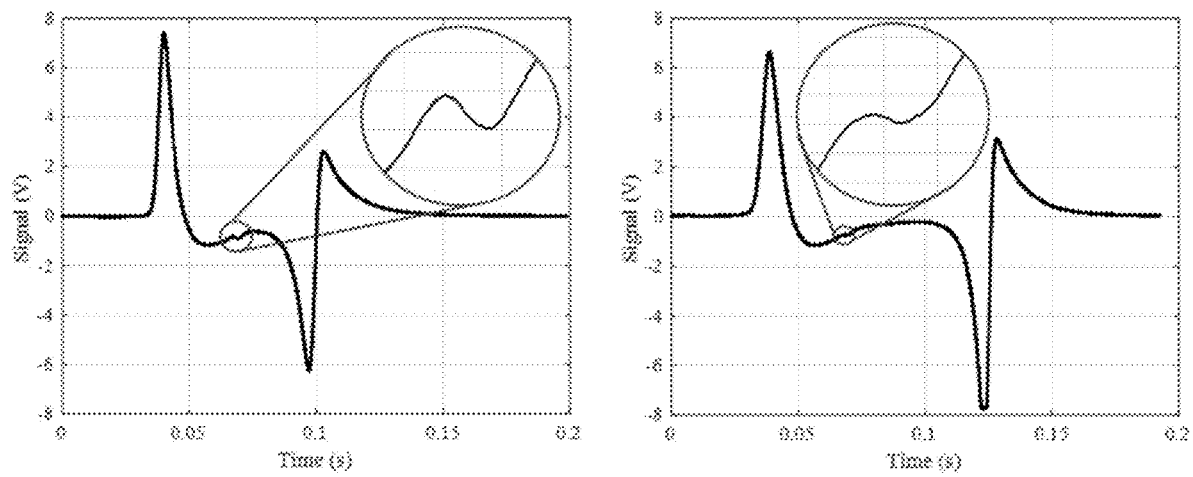
FIG. 23 shows two plots showing the detection of two different standard divots of different sizes according to some embodiments.

FIG. 23 shows two plots detecting two different standard divots of different sizes. These standard divots include a flat plate with a series of divots of decreasing size (e.g., 213A12N00551 NDE Standard 2). The large features show the NDE device detecting the edges of the plate. The small perturbation between the two large features is the defect. Despite the defect appearing small on this scale, it appears with excellent signal to noise ratio.

An imaging algorithm may compute the position of the pickup coil as a function of time throughout its rotation or translation. After one set of rotations or movements is complete, the probe head may be moved relative to the sample by a fixed increment, and another set of movements may be carried out. In this way, large areas can be scanned. In some embodiments, the position tracking could be accomplished with an optical system or an encoder wheel.

Figure 24:
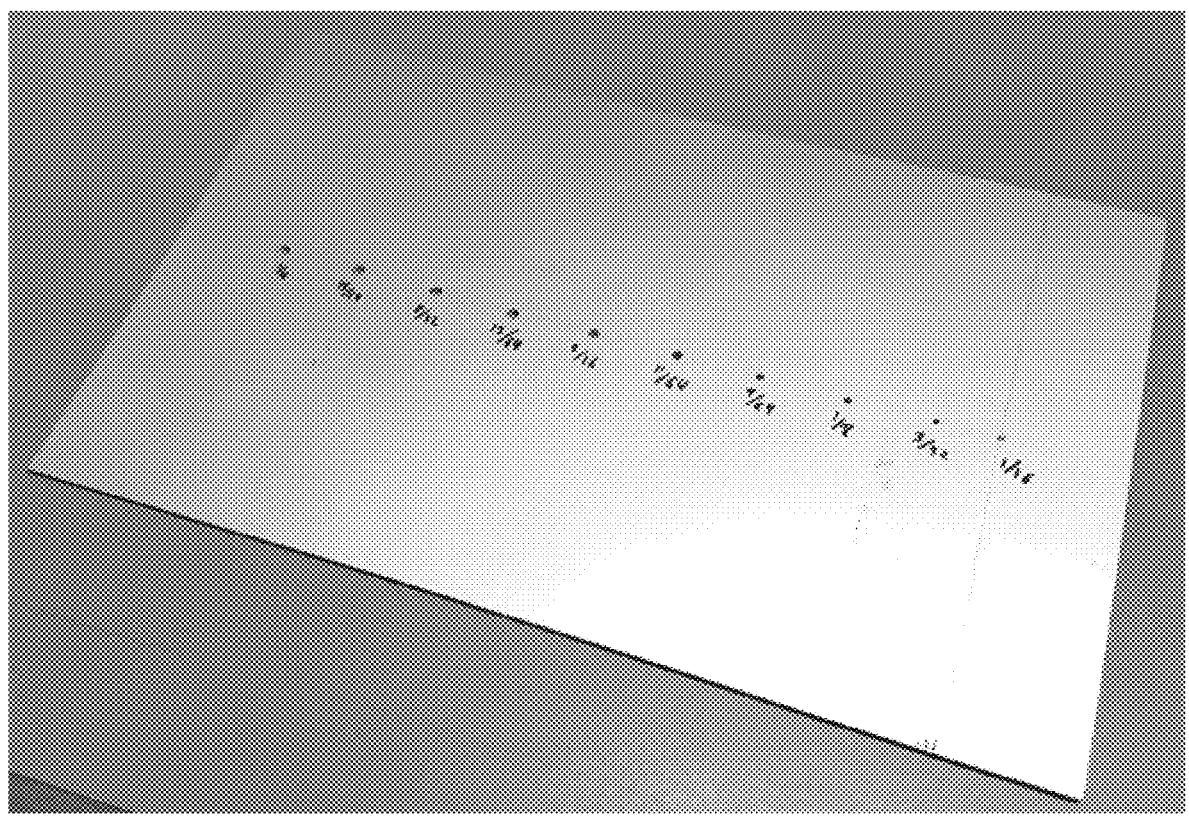
FIG. 24 is a ⅛" thick aluminum plate having a series of through holes of progressively smaller size from ¼" to ¹⁄₁₆" diameter.
Figure 25:
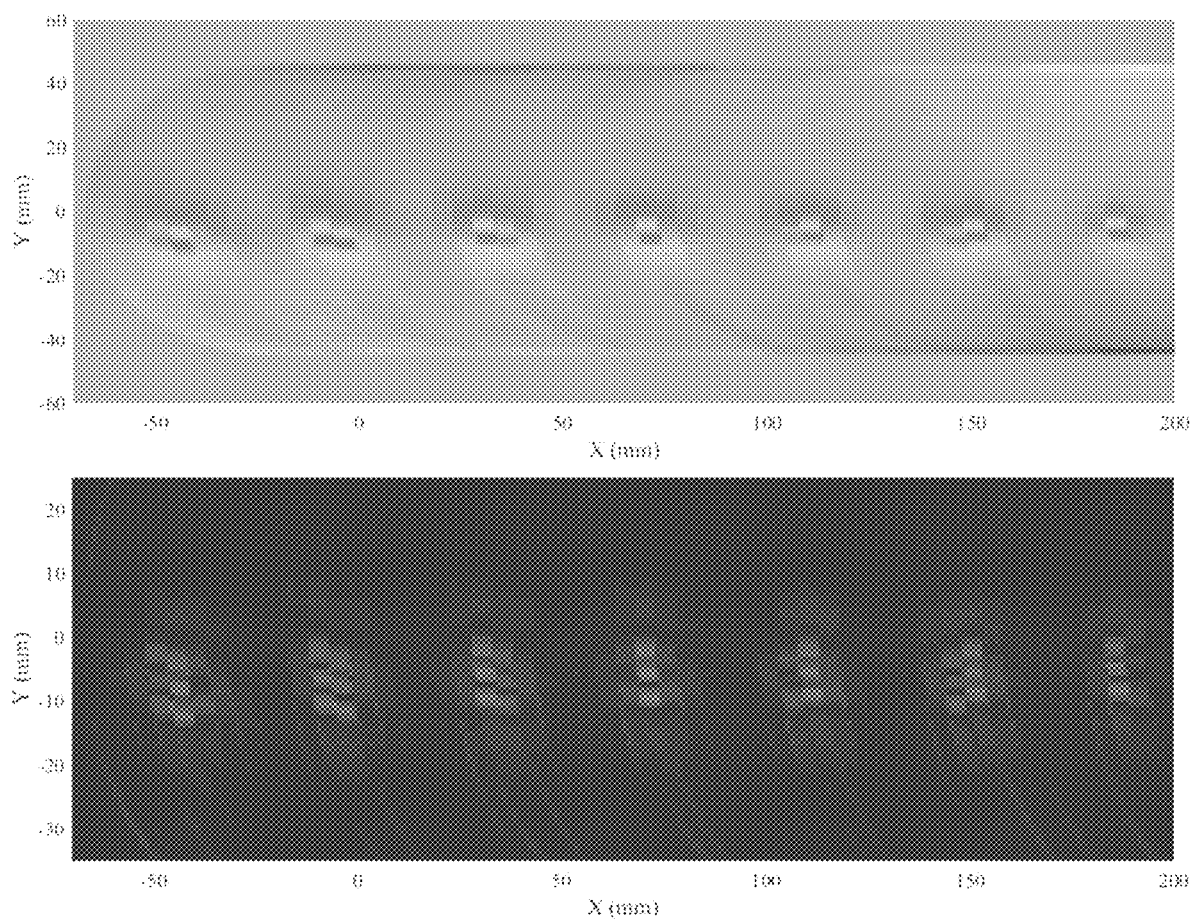
FIG. 25 shows the imaging results from the aluminum plate shown in FIG. 24 according to some embodiments.

FIG. 25 shows the imaging results from the ⅛" thick aluminum plate shown in FIG. 24 having a series of through holes of progressively smaller size from ¼" to ¹⁄₁₆" diameter. The top image in FIG. 25 shows the signal amplitude as a function of x,y position while the bottom image shows the derivative of the signal amplitude, which may highlight the defects more clearly. There are some interesting artifacts present. For example, the circular or linear path over which the probe head rotates is discernible.

In some embodiments, scanning of defects under a pressure wall repair kit (PWRK) patches can occur. These patches typically consisted of a section of metal tape with a rubber seal in the middle, which covers the damaged region and prevents the tape from being cut against the potentially sharp defect edges. In some embodiments, an NDE device can detect and image defects while rotating at a rate of only several hundred rpm, meaning that magnetic fields can pass much deeper into the material without reaching the skin depth limitation.

Figure 26:
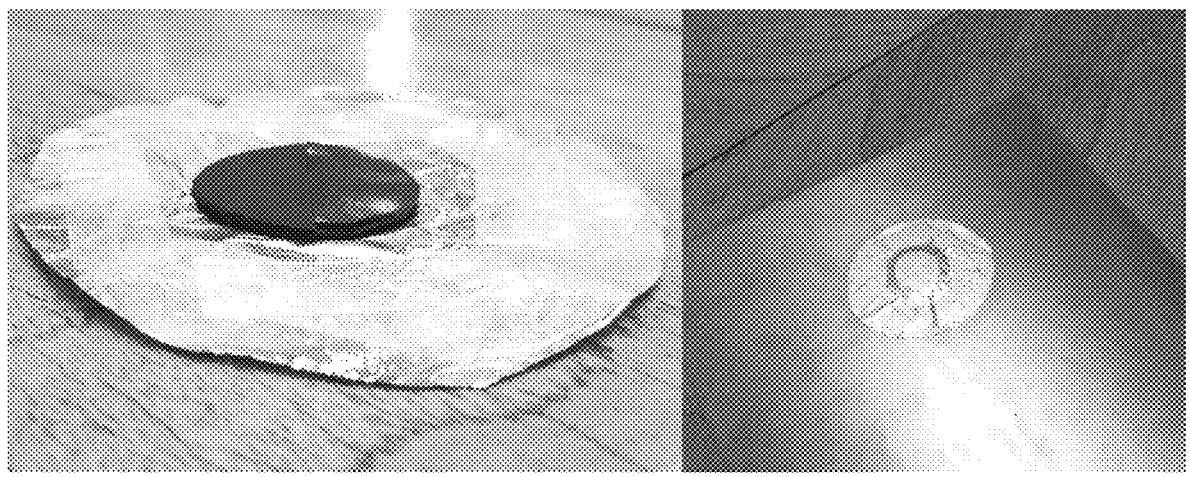
FIG. 26 shows a "mock-up" of a PWRK patch that includes Aluminum foil with a ⅛" thick rubber seal.

FIG. 26 shows a "mock-up" of a PWRK patch that includes Aluminum foil with a ⅛" thick rubber seal. This patch was adhered on the surface of a ¹⁄₁₆" thick Aluminum plate, centered over a ⅛" through hole.

Figure 27:
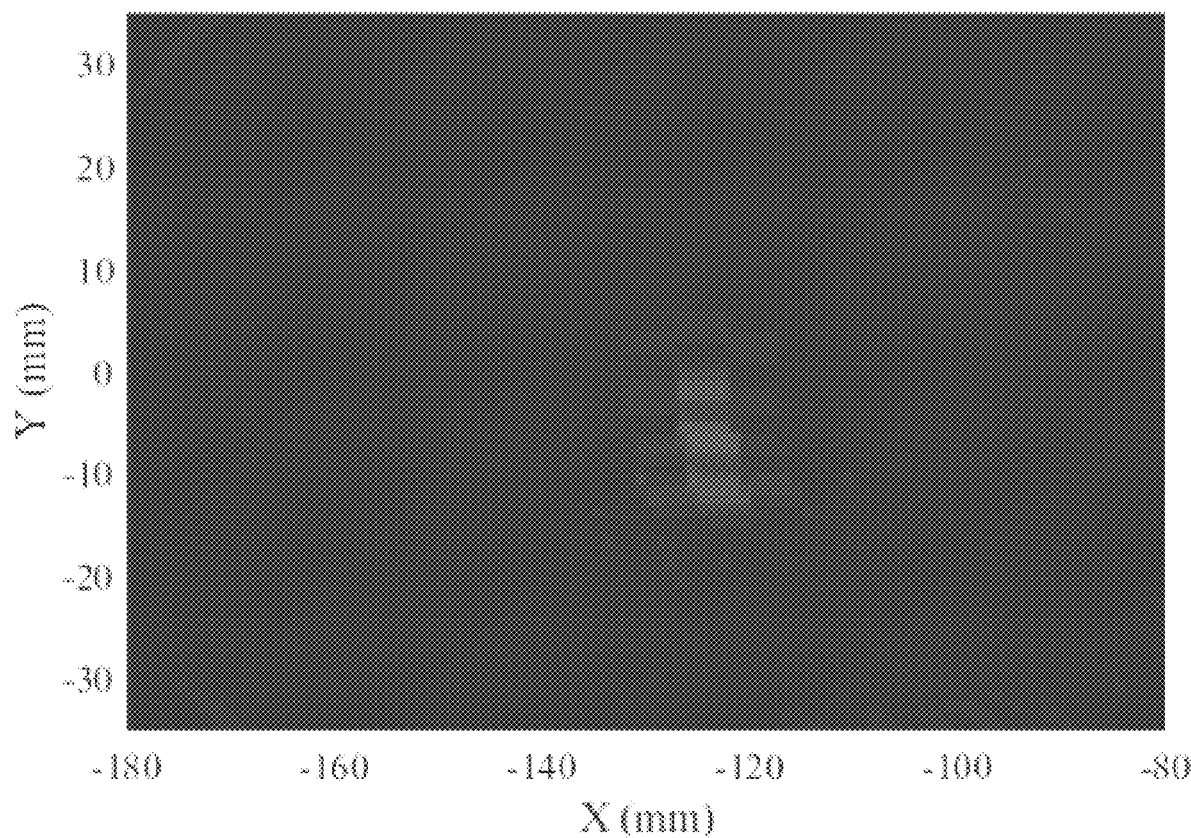
FIG. 27 shows an image from an NDE device detecting a defect through the PWRK patch.

In some embodiments, the spatial resolution of a system may be low compared to conventional eddy current tools. In some embodiments, an NDE device can detect and image a defect through the PWRK patch, as shown in FIG. 27. In some embodiments, the defect shape may be better resolved after the spatial resolution is enhanced.

Figure 28:
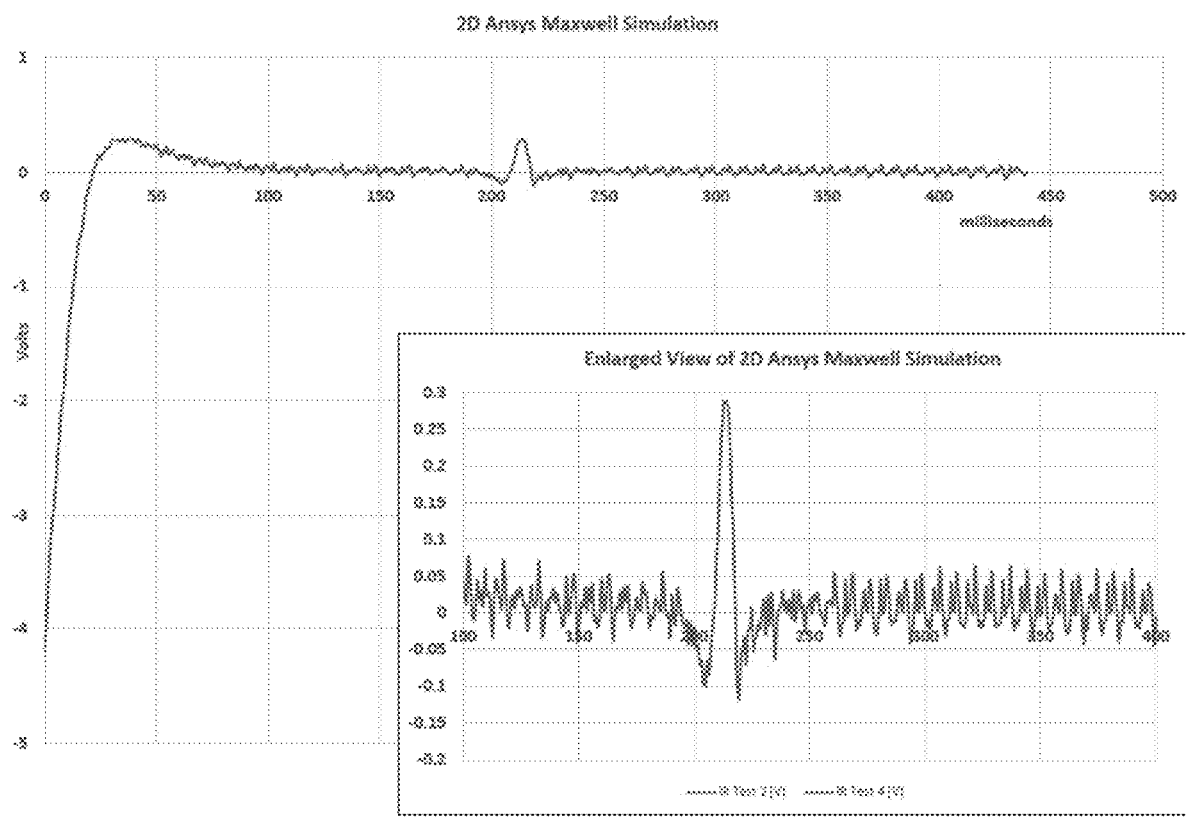
FIG. 28 is a plot of a 2D finite element simulation of a surface defect in aluminum according to some embodiments.

In some embodiments, the system may include an imaging algorithm based on 2D and 3D finite element solvers. The finite element solvers may simulate the induced voltage on a pickup coil travelling under a permanent magnet over a defect in a conductive material. These simulation results can be used to predict the actual signal from the NDE device for a given defect. In conjunction with a database of resultant signals obtained from the NDE device for known defect sizes and depths. In some embodiments, a machine learning algorithm may be used to accurately estimate the size and location in three dimensions of an unknown defect. FIG. 28 is a plot of a 2D finite element simulation of a surface defect in aluminum.

Figure 29:
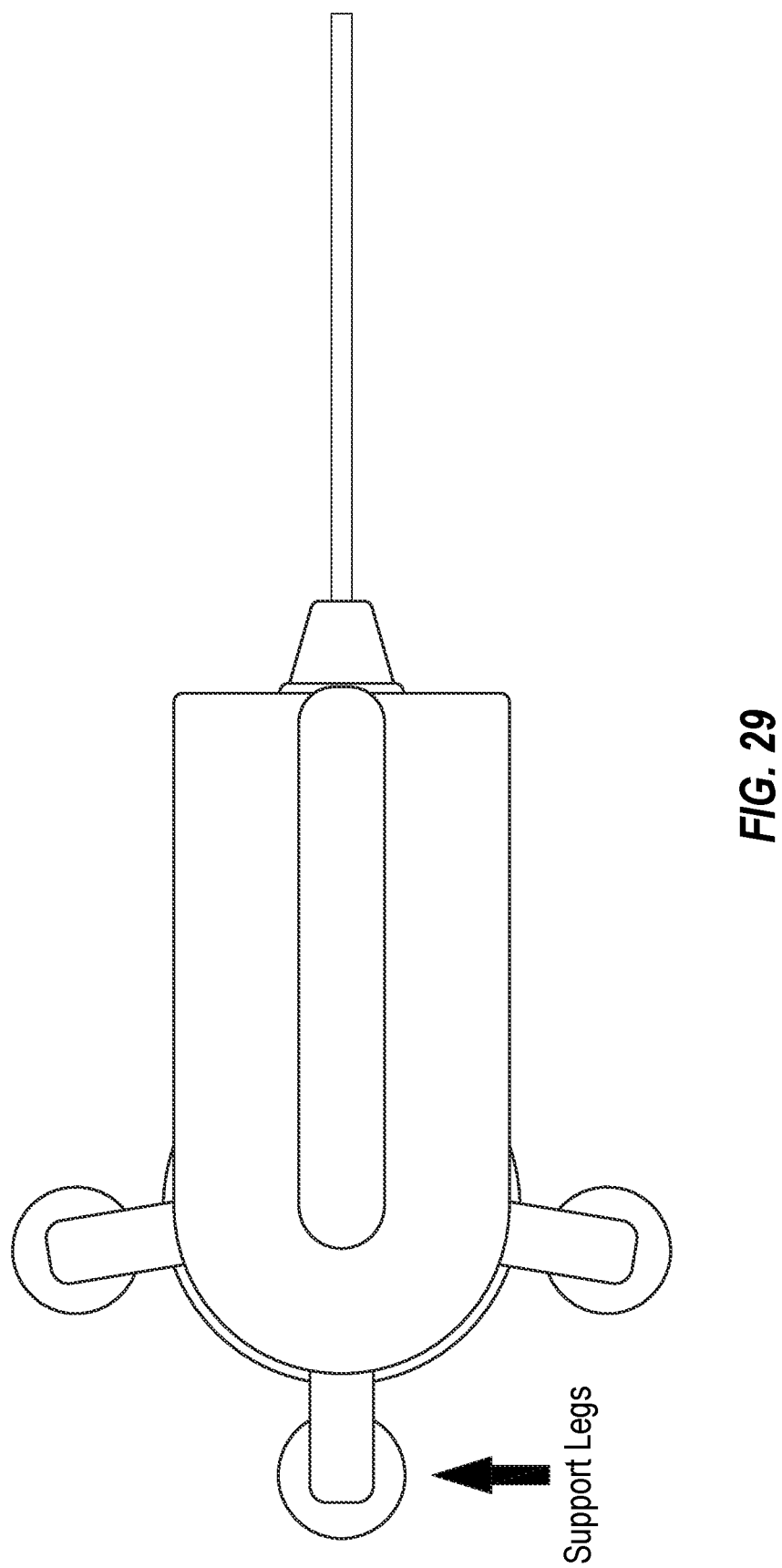
FIG. 29 is an image of an example handheld NDE device.
Figure 30:
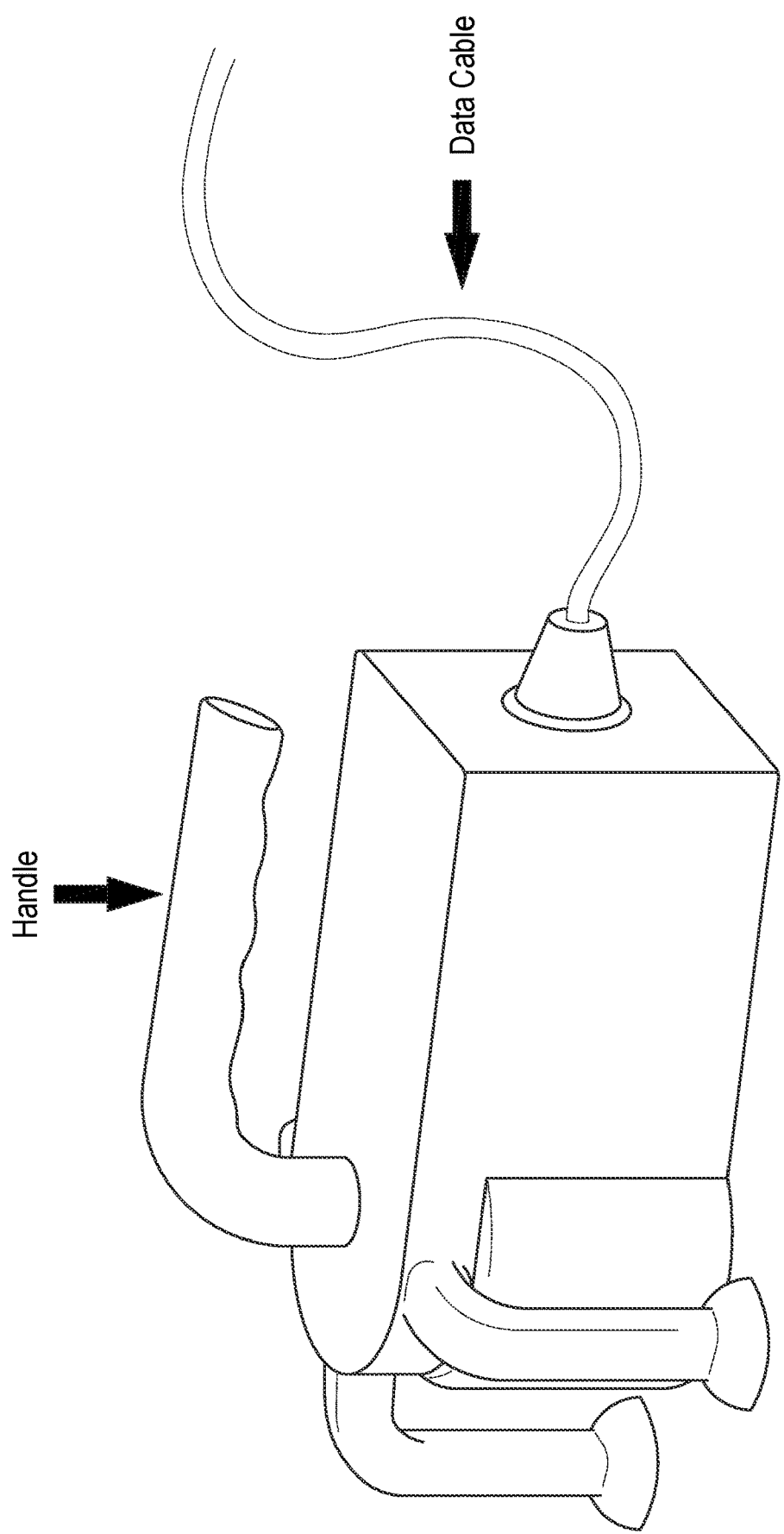
FIG. 30 is an image of an example handheld NDE device.
Figure 31:
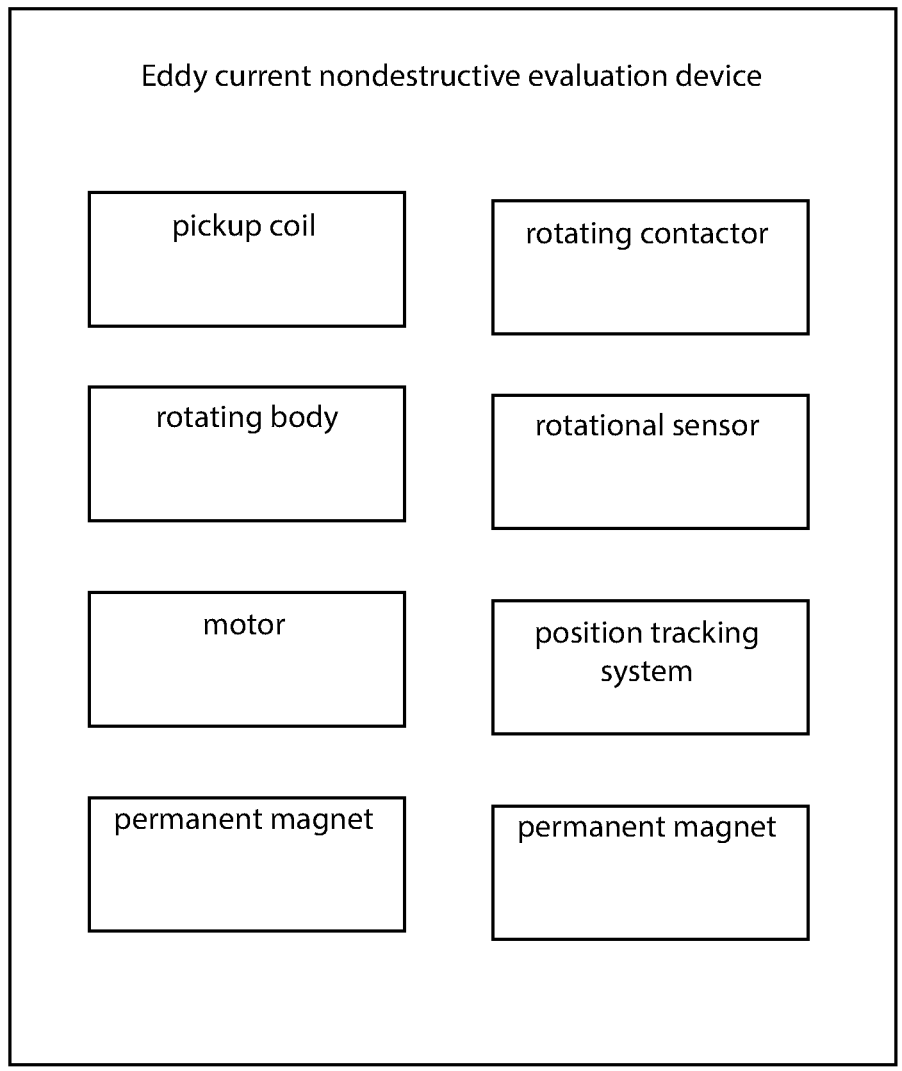
FIG. 31 is a block diagram of an NDE device according to some embodiments.

In some embodiments, an NDE device can include a stand-alone and/or handheld device. Data, for example, may be transmitted wirelessly to avoid the issue of feeding out signals from a rotating probe head to non-rotating electronics or data may be fed out through a data cable. FIG. 29 and FIG. 30 show an example handheld device.

Some embodiments may provide increased spatial resolution of the NDE device as well as improved sensitivity to smaller defects. This may be achieved by reducing the size of the magnet and/or pickup coil, and/or reducing the rotation radius. Decoupling the magnetic field source from the detector may enable other possibilities in NDE device design. For example, another way to increase spatial resolution may be to attach multiple small pickup coils to a single large permanent magnet. By varying the size of the pickup coils, down to about 0.020" diameter, separately from the size of the magnet, it may be possible to maintain deep scanning penetration depths (since the depth is dependent on the shape of the dipole field generated by the permanent magnet) while enhancing the spatial resolution, which depends on the size of the pickup coil.

In some embodiments, an NDE device may have faster rotation, which may aid in improving spatial resolution. In some embodiments, a NDE device that oscillates back and forth may be used, for example, using a piezo-electric actuator.

In some embodiments, a position encoding system to the NDE device may also be included so that scans of samples over large areas can be performed. In some embodiments, an optical position encoding system that does not require a reaction force may be considered.

FIGS. 29 and 30 show an example design of a handheld NDE device. In some embodiments, the interior may include a rotation apparatus to which varying probe heads may be attached. The varying probe heads may, for example, allow optimization for different applications as needed, depending on the sample material, sample thickness, and/or the nature of the defects of interest. In some embodiments, the magnets may rotate at a constant, trackable speed generating desired eddy currents within the material. In some embodiments, the supports may allow the NDE device to evenly rest on the surface, which may eliminate any motion other than the rotating magnets. This handheld NDE device may track the motion of NDE devices being swept over a surface. Additionally or alternatively, by sweeping the NDE devices at a constant rate over the same test spot over and over again multiple samples may be acquired in a short period of time allowing for a wide range of statistical analysis to be conducted providing for higher resolution measurements. In some embodiments, a probe head may be designed to not require rotation and can simply be moved by hand, when a quicker inspection with less setup time is desired.

Methods and systems for non-destructive evaluation (NDE) of structures are disclosed. Some embodiments may include eddy-current based systems and/or method that are able to circumvent some of the limitations of other NDE based tools. For instance, conventional eddy current methods use a single coil which may be driven by an AC waveform which induces eddy currents in the sample under test. The changing inductance of the sample at the locations of discontinuities affects the amplitude and phase relations of the current and voltage waveforms in the AC coil, and it is this information that is used to infer the presence and geometry of defects. In some embodiments, the physical movement of a permanent magnet may be used to generate eddy currents in the sample, and a separate inductive pickup coil, which may be fixed in location relative to the permanent magnet, may be used to measure changes in the magnetic field. The signal from the inductive pickup coil may be integrated by a High Gain Integrator, which may allow for very small signals to be measured. Because the pickup coil may be fixed relative to the permanent magnet, the large signals due to the movement of the permanent magnet are not measured. In some embodiments, only the signals that are caused by a discontinuity of the sample being tested are picked up by the coil.

In some embodiments, decoupling the source of the magnetic field from the detector in this way may allow for increased detection depth compared to conventional eddy current methods. In some embodiments, the performance of an NDE device can detect defects at greater than a ¼", ⅜", ½", etc. depth. Some embodiments may be able to image a through hole defect directly through a PWRK patch.

Unless otherwise specified, the term "substantially" means within 5% or 10% of the value referred to or within manufacturing tolerances. Unless otherwise specified, the term "about" means within 5% or 10% of the value referred to or within manufacturing tolerances.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. An eddy current nondestructive evaluation device comprising:
   a rotating body;
   a motor coupled with the rotating body such that the motor rotates the rotating body;
   a rotational sensor coupled with the rotating body, the rotational sensor measures angular rotation of the rotating body, wherein the rotational sensor comprises an accelerometer;
   a position tracking system that provides a spatial position of the eddy current nondestructive evaluation device, wherein the position tracking system comprises one or more of a laser, optics or an encoder wheel;
   a permanent magnet coupled with the rotating body;
   a pickup coil coupled with the rotating body; and
   an integrator circuit electrically coupled with the pickup coil that integrates a voltage from the pickup coil to produce integrated voltage data to provide spatial data of a defect in a sample.

2. The eddy current nondestructive evaluation device according to claim 1, wherein the pickup coil includes a plurality of loops wrapped around a bobbin coupled with the rotating body so that the permanent magnet and the pickup coil are stationary relative to one another while the rotating body is rotated.

3. The eddy current nondestructive evaluation device according to claim 1, wherein the integrator circuit has an RC time less than about 1 ms.

4. The eddy current nondestructive evaluation device according to claim 1, wherein the integrator circuit is stable for more than about 1 second.

5. The eddy current nondestructive evaluation device according to claim 1, wherein the motor is configured to vary an angular velocity of the rotating body between 1 Hz and 200 Hz.

6. The eddy current nondestructive evaluation device according to claim 1, wherein the integrator circuit comprises one or more droop resistors placed across at least one integration capacitor to achieve a droop RC timescale between 1 μs and 100 ms.

7. The eddy current nondestructive evaluation device according to claim 1, wherein the integrator circuit is coupled within the rotating body.

8. The eddy current nondestructive evaluation device according to claim 1, further comprising a data acquisition unit electrically coupled with the integrator circuit.

9. The eddy current nondestructive evaluation device according to claim 1, wherein the pickup coil comprises between 20 and 3000 loops of wire.

10. The eddy current nondestructive evaluation device according to claim 1, further comprising a wireless transmitter coupled with the rotating body and electrically coupled with the integrator circuit, the wireless transmitter configured to wirelessly transmit either or both the integrated voltage data and the voltage from the pickup coil.

11. The eddy current nondestructive evaluation device according to claim 1, further comprising:
   a second permanent magnet coupled with the rotating body; and
   a second pickup coil coupled with the rotating body.

12. The eddy current nondestructive evaluation device according to claim 11, further comprising a second integrator circuit electrically coupled with the second pickup coil that integrates a voltage from the second pickup coil to produce integrated voltage data.

13. The eddy current nondestructive evaluation device according to claim 1, further comprising a rotating contactor providing electrical signals and/or power from within the rotating body to be coupled to an external non-rotating wiring harness.

14. The eddy current nondestructive evaluation device according to claim 1, further comprising a data storage and retrieval system coupled with the rotating body and electrically coupled with the integrator circuit.

15. An eddy current nondestructive evaluation device comprising:
   a translating body;
   a permanent magnet coupled with the translating body;
   a pickup coil coupled with the translating body;
   a rotational sensor coupled with the translating body, the rotational sensor measures angular rotation of the rotating body, wherein the rotational sensor comprises an accelerometer;
   a position tracking system that provides a spatial position of the eddy current nondestructive evaluation device, wherein the position tracking system comprises one or more of a laser, optics or an encoder wheel; and
   an integrator circuit disposed within the translating body, the integrator circuit electrically coupled with the pickup coil that integrates a voltage from the pickup coil to produce integrated voltage data to provide spatial data of a defect in a sample.

16. The eddy current nondestructive evaluation device according to claim 15, wherein the translating body is coupled with a fixed apparatus and a sample is translated or rotated relative to the translating body.

17. The eddy current nondestructive evaluation device according to claim 15, wherein the translation rate of the translating body relative to a sample surface is about 0.05 m/s to about 10 m/s.

18. The eddy current nondestructive evaluation device according to claim 15, wherein the permanent magnet comprises a plurality of permanent magnets.

19. The eddy current nondestructive evaluation device according to claim 15, wherein the pickup coil comprises a plurality of pickup coils.

20. The eddy current nondestructive evaluation device according to claim 15, wherein the pickup coil is either stationary or moving relative to the permanent magnet.

21. A method comprising: moving a rotating body having one or more permanent magnets and one or more pickup coils at a rate of movement near a surface of a sample;
    measuring an angular rotation of the rotating body with an accelerometer;
    measuring a spatial position of the rotating body with a position tracking system that comprises one or more of a laser, optics or an encoder wheel;
    integrating one or more voltage signals from the one or more pickup coils to produce integrated voltage data; and
    determining spatial data of a defect in the sample based at least on the integrated voltage data and the rate of movement, wherein the spatial data includes at least one of a depth, a size, and a shape of the defect.

22. The method according to claim 21, further comprising varying the rate of movement in response to integrated voltage data.

23. The method according to claim 21, further comprising:
    reconstructing the size and shape of a defect in the sample based on the integrated voltage data and the rate of movement.

24. The method according to claim 21, further comprising:
    identifying defects in the surface of the sample by comparing the integrated voltage data with a reference database of known samples and defects.

* * * * *